(12) United States Patent

Sun

(10) Patent No.: US 9,524,451 B2
(45) Date of Patent: Dec. 20, 2016

(54) RECORDING MEDIUM AND RECORDED MATTER

(71) Applicant: Brother Kogyo Kabushiki Kaisha, Nagoya-shi, Aichi-ken (JP)

(72) Inventor: Yongqi Sun, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 104 days.

(21) Appl. No.: 14/446,432

(22) Filed: Jul. 30, 2014

(65) Prior Publication Data

US 2015/0037545 A1    Feb. 5, 2015

(30) Foreign Application Priority Data

Jul. 30, 2013  (JP) .................................. 2013-158230

(51) Int. Cl.
*B32B 3/00*       (2006.01)
*G06K 15/02*      (2006.01)
*G06F 3/12*       (2006.01)

(52) U.S. Cl.
CPC .......... *G06K 15/1801* (2013.01); *G06F 3/125* (2013.01); *G06F 3/1208* (2013.01); *G06F 3/1285* (2013.01); *Y10T 428/24802* (2015.01)

(58) Field of Classification Search
CPC .... G06K 15/1801; G06F 3/1208; G06F 3/125; G06F 3/1285; Y10T 428/24802
See application file for complete search history.

(56) References Cited

U.S. PATENT DOCUMENTS

| 5,222,818 A | 6/1993 | Akiyama et al. |
| 6,351,275 B1 * | 2/2002 | Ayling .................. B41J 3/4075 347/171 |
| 6,438,509 B1 | 8/2002 | Hayama et al. |
| 2009/0201296 A1 | 8/2009 | Tamaki |

FOREIGN PATENT DOCUMENTS

| JP | H09-234846 A | 9/1997 |
| JP | H10-230652 A | 9/1998 |

OTHER PUBLICATIONS

Dec. 4, 2014—(EP) European Search Report—App 14179053.5.
Esko Artwork: "DeskPack Module Descriptions. Tools for Adobe Illustrator", Oct. 10, 2004, XP055155397, Retrieved from the Internet: URL: http://www.esko.com/en/~/media/Esko/Files/PDF%20Library/deskpack/DeskPack_Module_Description_us.pdf?lang=tr. [retrieved on Nov. 27, 2014] p. 16-17.

* cited by examiner

*Primary Examiner* — Elizabeth Mulvaney
(74) *Attorney, Agent, or Firm* — Banner & Witcoff, Ltd.

(57) ABSTRACT

The disclosure discloses a non-transitory computer-readable recording medium storing print data editing program. The program executes steps including a background patter print data generating, a disposition setting, and a disposition adjusting. In the disposition adjusting, at least one spacing adjustment of column spacing adjustment and row spacing adjustment is performed. The column spacing adjusts the column spacing so that a length of the sides parallel with the angle of inclination in the disposition adjustment region becomes an integer multiple of a total length of a length of the background pattern print data along the row direction and the column spacing. The row spacing adjustment adjusts the row spacing so that a length of the sides orthogonal to the angle of inclination becomes an integer multiple of a total length of a length of the background pattern print data along the column direction and the row spacing.

10 Claims, 23 Drawing Sheets

FIG. 6
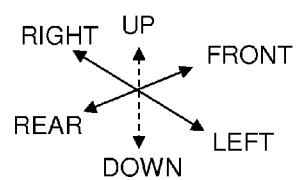
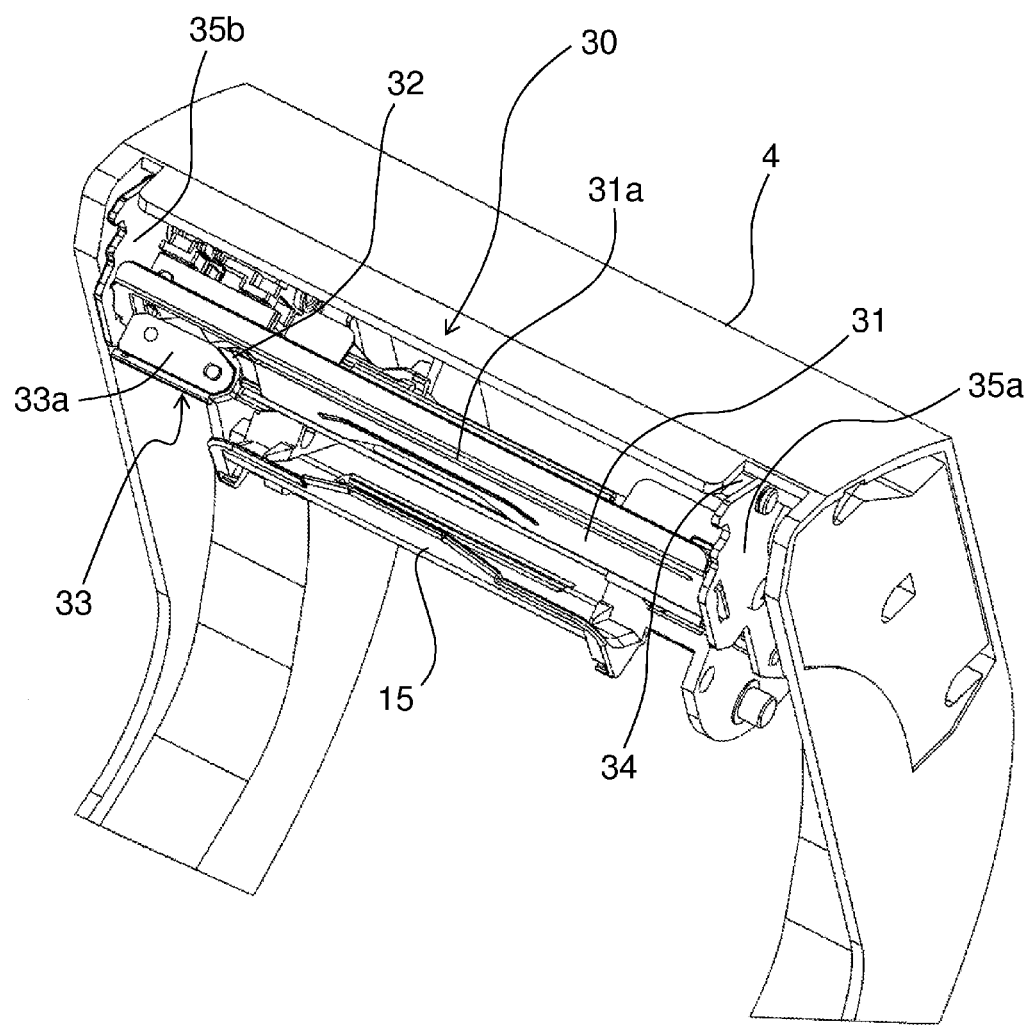

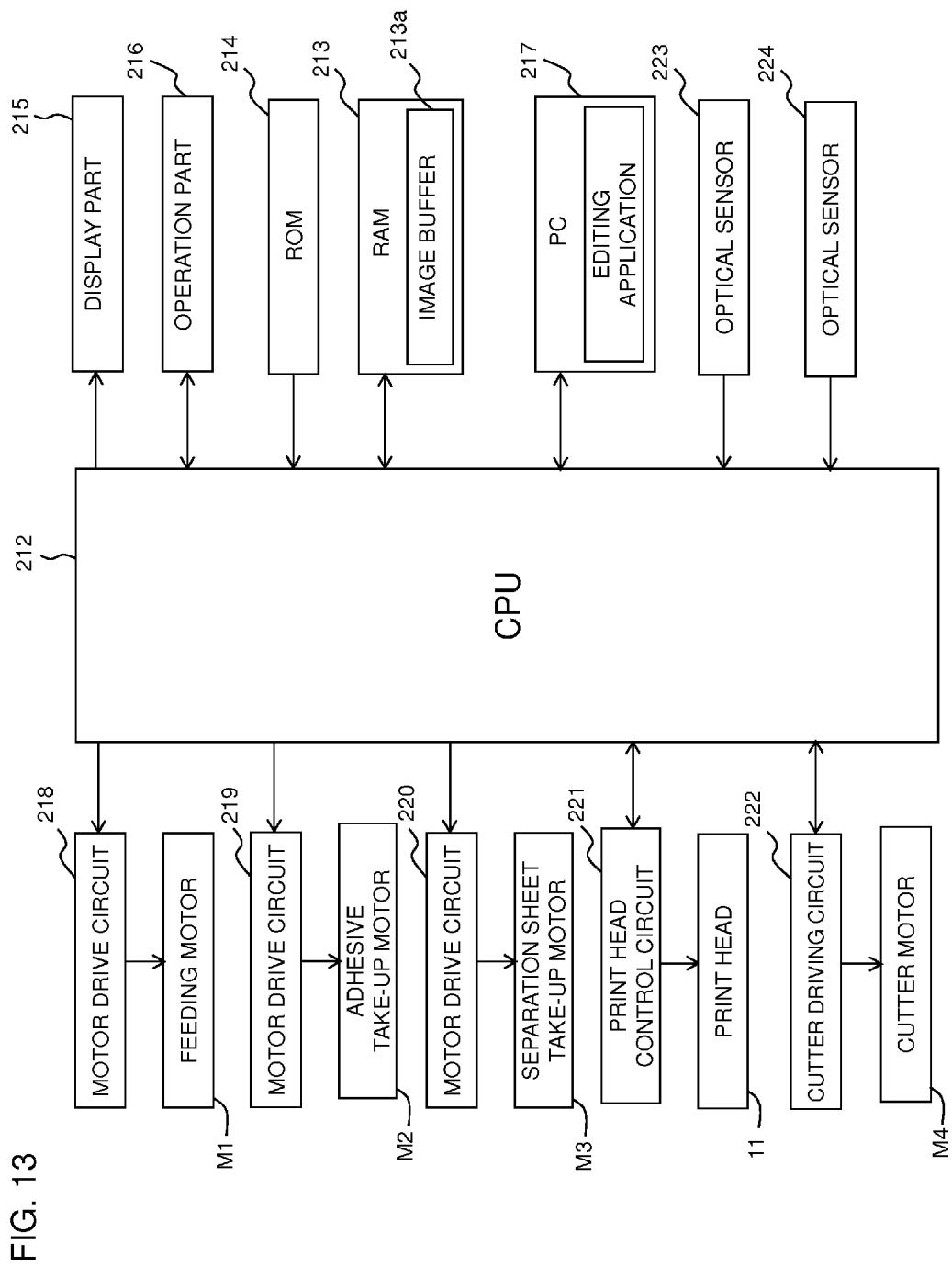

RECORDING MEDIUM AND RECORDED MATTER

CROSS-REFERENCE TO RELATED APPLICATION

The present application claims priority from Japanese Patent Application No. 2013-158230, which was filed on Jul. 30, 2013, the disclosure of which is incorporated herein by reference in its entirety.

BACKGROUND

Field

The present disclosure relates to a recording medium storing a print data editing program that edits print data for printing repeatedly based on a predetermined unit length in a transport direction of a medium to be recorded, and a recorded matter produced based thereon.

Description of the Related Art

When printing on a long medium to be recorded, such as tape, the data amount becomes extensive if the print data is generated across the entire length thereof. Hence, a prior art that discloses a technique whereby entered printing contents are continuously repeatedly printed based on a predetermined unit length along a transport direction of a medium to be recorded, is known.

On the other hand, in a repeated unit region of the predetermined unit length repeatedly printed, the same background pattern print data is printed in each of a plurality of regularly disposed locations, thereby printing a uniformly decorative background design across the entire length of the medium to be recorded. However, depending on the regular disposition settings of the background pattern print data in the repeated unit region, the print of the background pattern print data may become discontinuous at the boundary between two continuous repeated unit regions, marring the aesthetics.

SUMMARY

It is therefore an object of the present disclosure to provide a recording medium storing a print data editing program capable of maintaining the continuity and improving the aesthetics of the print of background pattern print data between repeated unit regions, even in a case where the regular disposition of the background pattern print data in the repeated unit region is arbitrarily set, and recorded matter produced based on the same.

In order to achieve the above-described object, according to the aspect of the present application, there is provided a non-transitory computer-readable recording medium, storing print data editing program for executing steps on a computing device provided in an operation terminal for operating a recorded matter producing apparatus that comprises a feeder configured to feed a medium to be recorded and a printing head configured to perform printing based on print data on the medium to be recorded fed by the feeder, and is capable of producing a recorded matter wherein desired print is printed on the medium to be recorded based on the print data along a transport direction by the feeder, the steps comprising a background pattern print data generating that generates identical background pattern print data respectively to be printed in a plurality of regularly disposed locations in a repeated unit region for repeatedly printing based on a predetermined unit length along the transport direction of the medium to be recorded, a disposition setting that sets a row spacing with a disposition direction along a reference direction of the background pattern print data as a row direction, a column spacing, and an angle of inclination of the row direction with respect to the transport direction, for the regular disposition of the background pattern print data in the repeated unit region, and a disposition adjusting that adjusts the regular disposition set in the disposition setting so as to impart periodicity with respect to the predetermined unit length along the transport direction, in the disposition adjusting, a rectangular disposition adjustment region that is enclosed by both two sides parallel with the angle of inclination and two sides orthogonal to the angle of inclination, and comprises a length of the diagonal equal to the predetermined unit length, being set, and it being performed that at least one spacing adjustment of column spacing adjustment that approximately adjusts the column spacing set in the disposition setting so that a length of the sides parallel with the angle of inclination in the disposition adjustment region becomes an integer multiple of a total length of a length of the background pattern print data along the row direction and the column spacing, and row spacing adjustment that approximately adjusts the row spacing set in the disposition setting so that a length of the sides orthogonal to the angle of inclination in the disposition adjustment region becomes an integer multiple of a total length of a length of the background pattern print data along the column direction and the row spacing.

According to the present disclosure, after the regular disposition of the background pattern print data in the repeated unit region is set by a disposition setting procedure, the regular disposition is adjusted by imparting periodicity with respect to the predetermined unit length along the transport direction by a disposition adjusting procedure. Specifically, the regular disposition is adjusted by first setting a rectangular disposition adjustment region enclosed by two sides parallel with an angle of inclination and two sides orthogonal to the angle of inclination, with the predetermined unit length as the length of the diagonal. Then, at least one spacing adjustment of row spacing adjustment or column spacing adjustment is performed.

The column spacing adjustment approximately adjusts the column spacing set by the disposition setting procedure so that the length of the sides parallel with the angle of inclination of the disposition adjustment region becomes an integer multiple of the total length of the row-direction length and column spacing of the background pattern print data. The row spacing adjustment approximately adjusts the row spacing set by the disposition setting procedure so that the length of the sides orthogonal to the angle of inclination of the disposition adjustment region becomes an integer multiple of the total length of the column-direction length and row spacing of the background pattern print data.

Adjusting the regular disposition settings by such a disposition adjusting procedure makes it possible to maintain the continuity and improve the aesthetics of the print of the background pattern print data between repeated unit regions, even in a case where the regular disposition of the background pattern print data in the repeated unit region is arbitrarily set.

BRIEF DESCRIPTION OF THE DRAWINGS

FIG. 6 is a perspective view showing the cutter mechanism disposed on the frontward side opening/closing cover.

FIG. 13 is a block diagram showing the configuration of the control system of the tape printer.

DETAILED DESCRIPTION OF THE PREFERRED EMBODIMENTS

Figure 1:
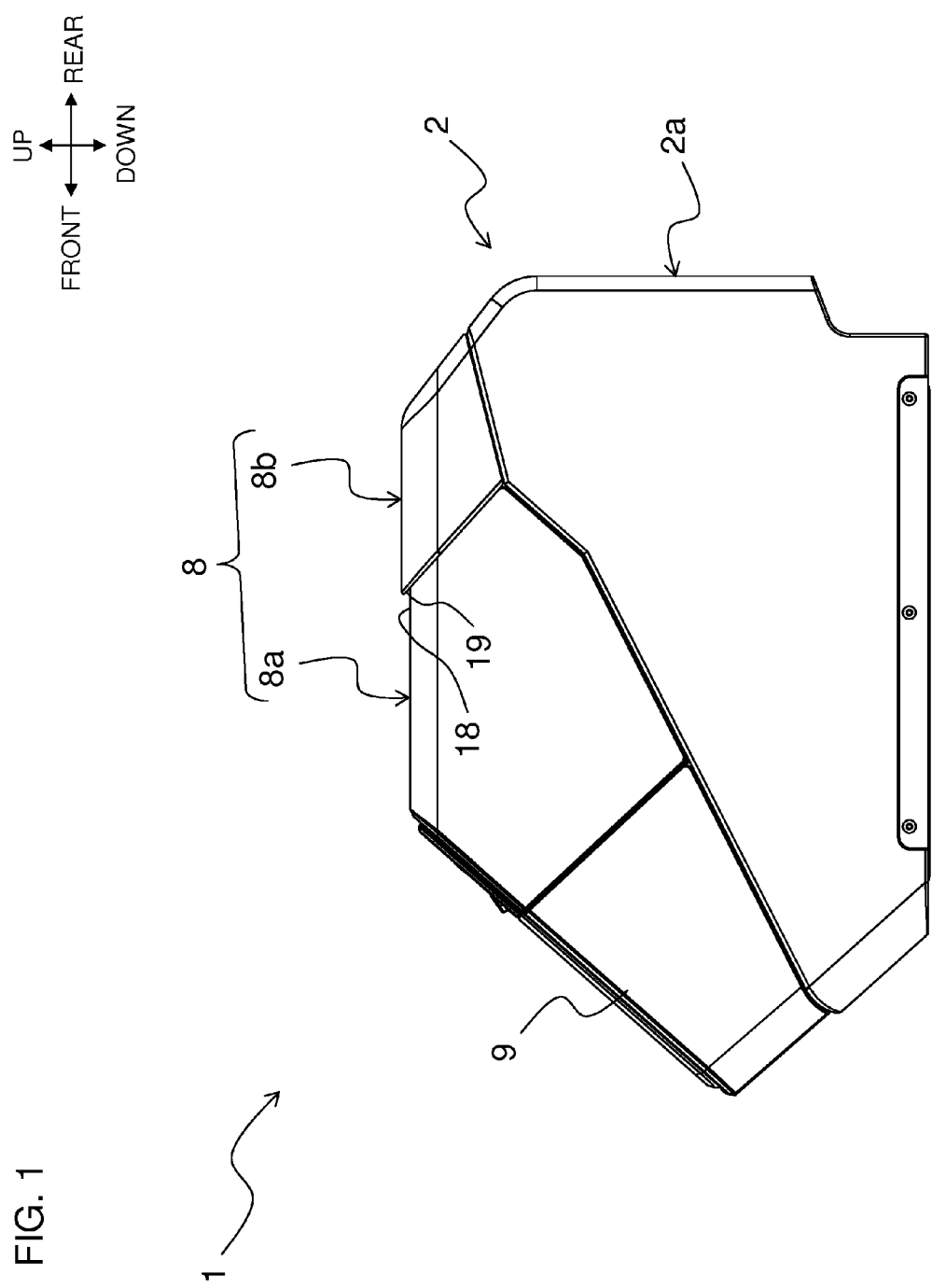
FIG. 1 is a right side view showing the outer appearance of a tape printer that prints print data edited and generated by a print data editing program of an embodiment of the present disclosure.

The following describes one embodiment of the present disclosure with reference to accompanying drawings. Note that, in a case where "Front," "Rear," "Left," "Right," "Up," and "Down" are denoted in the drawings, the terms "Frontward (Front)," "Rearward (Rear)," "Leftward (Left)," "Rightward (Right)," "Upward (Up)," and "Downward (Down)" in the explanations in the description refer to the denoted directions.

General Configuration of Tape Printer

First, the following describes the general configuration of the tape printer that prints print data edited and generated by a print data editing program in this embodiment to produce a print tape roll, with reference to FIGS. 1-4.

In FIGS. 1-4, a tape printer 1 comprises a housing 2 that constitutes the apparatus outer contour, a rearward-side opening/closing part 8, and a frontward-side opening/closing cover 9.

The housing 2 comprises a housing main body 2a, a first storage part 3 disposed on the rearward side of the housing main body 2a, and a second storage part 4 and a third storage part 5 disposed on the frontward side of the housing main body 2a. Note that the first storage part 3, the second storage part 4, and the third storage part 5 will be described later in further detail.

The rearward-side opening/closing part 8 is connected to the upper area of the rearward side of the housing main body 2a in an openable and closeable manner. This rearward-side opening/closing part 8 is capable of opening and closing the area above the first storage part 3 by pivoting. The rearward-side opening/closing part 8 comprises a first opening/closing cover 8a and a second opening/closing cover 8b.

The first opening/closing cover 8a is capable of opening and closing the area above the frontward side of the first storage part 3 by pivoting around a predetermined pivot axis K1 disposed in the upper area of the rearward side of the housing main body 2a. Specifically, the first opening/closing cover 8a is capable of pivoting from a closed position (the states of FIGS. 1-2) in which it covers the area above the frontward side of the first storage part 3, to an open position (the states of FIGS. 3 and 4) in which it exposes the area above the frontward side of the first storage part 3. At this time, the positions of the pivot axis K1 of the first opening/closing cover 8a in the front-rear direction and the up-down direction are further on the rearward side and further on the upward side, respectively, than a roll center RO of a first roll R1 (described later) stored in the first storage part 3.

Figure 2:
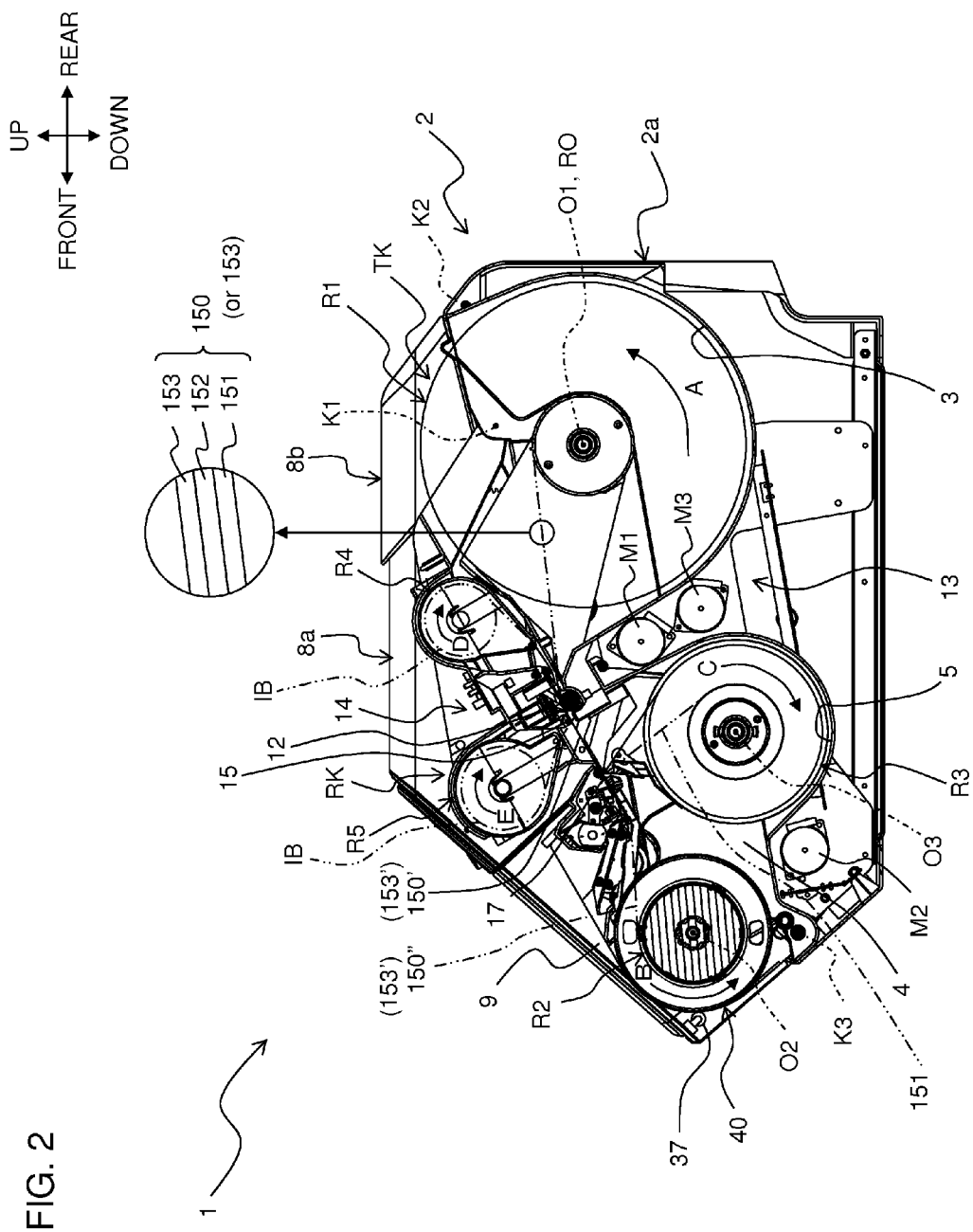
FIG. 2 is a side cross-sectional view showing the internal structure of the tape printer.
Figure 3:
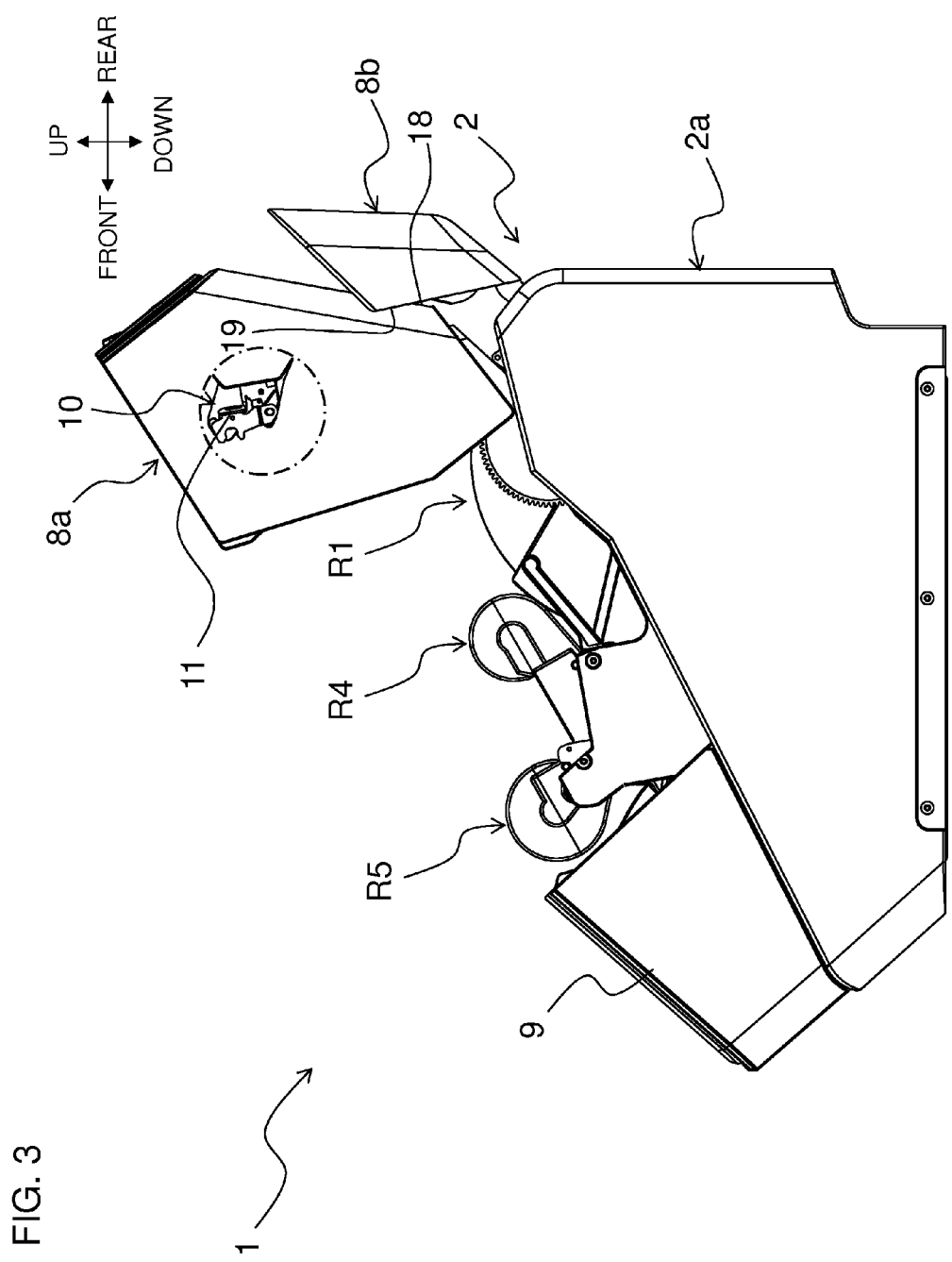
FIG. 3 is a right side view showing the outer appearance of the tape printer with the first and the second opening/closing covers open.

A head holding body 10 is disposed in the interior of the first opening/closing cover 8a (refer to FIG. 3). Then, the first opening/closing cover 8a pivots around the above described pivot axis K1, making it possible to move a print head 11 disposed on the head holding body 10 relatively closer to or farther away from a feeding roller 12 disposed on the housing main body 2a. Specifically, the first opening/closing cover 8a is capable of pivoting from a closed position (the state of FIG. 2) in which the print head 11 is close to the feeding roller 12, to an open position (the state of FIG. 3) in which the print head 11 is far away from the feeding roller 12.

The second opening/closing cover 8b is disposed further on the rearward side than the above described first opening/closing cover 8a, and is capable of opening and closing the area above the rearward side of the first storage part 3 separately from the opening and closing of the above described first opening/closing cover 8a by pivoting around a predetermined pivot axis K2 disposed on the upper end of the rearward side of the housing main body 2a. Specifically, the second opening/closing cover 8b is capable of pivoting from a closed position (the states of FIGS. 1 and 2) in which it covers the area above the rearward side of the first storage part 3, to an open position (the states of FIGS. 3 and 4) in which it exposes the area above the rearward side of the first storage part 3. At this time, the positions of the pivot axis K2 of the second opening/closing cover 8b in the front-rear direction and the up-down direction are further on the rearward side and further on the upward side, respectively, than the pivot axis K1 of the above described first opening/closing cover 8a. Note that the position of the pivot axis K2 of the second opening/closing cover 8b in the up-down direction may be the same as that of the pivot axis K1 of the above described first opening/closing cover 8a.

Then, the first opening/closing cover 8a and the second opening/closing cover 8b are configured so that, when each is closed, an outer peripheral part 18 of the first opening/closing cover 8a and an edge part 19 of the second opening/closing cover 8b substantially contact each other and cover almost the entire area above the first storage part 3.

The frontward-side opening/closing cover 9 is connected to the upper area of the frontward side of the housing main body 2a in an openable and closeable manner. The frontward-side opening/closing cover 9 is capable of opening and closing the area above the second storage part 4 by pivoting around the predetermined pivot axis K3 disposed on the upper end of the frontward side of the housing main body 2a. Specifically, the frontward-side opening/closing cover 9 is capable of pivoting from a closed position (the states of FIGS. 1-3) in which it covers the area above the second storage part 4, to an open position (the state of FIG. 4) in which it exposes the area above the second storage part 4.

At this time, a tape cartridge TK is detachably mounted in a first predetermined position 13 located below the frontward-side opening/closing cover 9 with the housing main body 2a closed. The tape cartridge TK comprises the first roll R1, a third roll R3, and a connecting arm 16 (refer to FIG. 4) that connects the first roll R1 and the third roll R3.

The first roll R1 is supported on the rearward side of the tape cartridge TK by the connecting arm 16, rotating freely when the tape cartridge TK is mounted to the housing main body 2a. On the first roll R1, a print-receiving tape 150 consumed by feed-out is wound around an axis O1 of the left-right direction in advance. Note that, in each figure of this application, the above described print-receiving tape 150 disposed on the above described roll R1 is suitably omitted (to avoid complexities in illustration), and only a substantially circular roll flange part disposed so as to sandwich both width-direction sides of the print-receiving tape 150 is shown. In this case, as a matter of convenience, the roll flange part is schematically depicted using the reference numeral "R1."

Then, at this time, the first roll R1 is received from above in the first storage part 3 by the mounting of the tape cartridge TK and stored with the axis O1 of the winding of the print-receiving tape 150 in the left-right direction. Then, the first roll R1, stored in the first storage part 3 (with the tape cartridge TK mounted), rotates in a predetermined rotating direction (a direction A in FIG. 2) inside the first storage part 3, thereby feeding out the print-receiving tape 150. According to this embodiment, both an adhesive tape and a non-adhesive tape may be used as the print-receiving tape 150. FIG. 2 illustrates a case where an adhesive print-receiving tape 150 is used. That is, the print-receiving tape 150 is layered in the order of a base layer 153, an adhesive layer 152, and a separation material layer 151, from one side in the thickness direction (upward side in the partially enlarged view in FIG. 2) to the other side (downward side in the partially enlarged view in FIG. 2). The base layer 153 is a layer on which desired print is formed by the above described print head 11. The adhesive layer 152 is a layer for affixing the base layer 153 to a suitable adherent (not shown). The separation material layer 151 is a layer that covers the adhesive layer 152. The following describes the embodiment based on a case where the above described adhesive print-receiving tape 150 is used, unless otherwise specified.

Further, the above described feeding roller 12 is disposed on a middle upward side of the first storage part 3 and the third storage part 5 of the housing main body 2a. The feeding roller 12 is driven by a feeding motor M1 disposed in the housing main body 2a via a gear mechanism (not shown), thereby feeding the print-receiving tape 150 fed out from the first roll R1 stored in the first storage part 3 in a tape posture in which the tape-width direction is in the left-right direction.

Further, the above described head holding part 10 disposed on the first opening/closing cover 8a comprises the above described print head 11. The print head 11, as described above, is capable of moving relatively closer to or farther away from the feeding roller 12 by the pivoting of the first opening/closing cover 8a around the pivot axis K1. That is, the print head 11 moves closer to the feeding roller 12 when the first opening/closing cover 8a is closed, and farther away from the feeding roller 12 when the first opening/closing cover 8a is opened. This print head 11 is disposed in a position that faces the area above the feeding roller 12 of the head holding part 10, with the first opening/closing cover 8a closed, sandwiching the print-receiving tape 150 fed by the feeding roller 12 in coordination with the feeding roller 12. Accordingly, when the first opening/closing cover 8a is closed, the print head 11 and the feeding roller 12 are disposed facing each other in the up-down direction. Then, the print head 11 forms desired print on the above described base layer 153 of the print-receiving tape 150 sandwiched between the print head 11 and the feeding roller 12 using an ink ribbon IB of a ribbon cartridge RK described later, thereby forming a tape 150' with print.

At this time, the ribbon cartridge RK is detachably mounted in a second predetermined position 14, which is below the first opening/closing cover 8a in a closed state and above the tape cartridge TK in the housing main body 2a. The ribbon cartridge RK comprises a ribbon supply roll R4 and a ribbon take-up roll R5.

The ribbon supply roll R4 is rotatably supported on the rearward side of the ribbon cartridge RK, and rotates in a predetermined rotating direction (a direction D in FIG. 2) with the ribbon cartridge RK mounted, thereby feeding out the ink ribbon IB for forming print by the print head 11.

The ribbon take-up roll R5 is rotatably supported on the frontward side of the ribbon cartridge RK and rotates in a predetermined rotating direction (a direction E in FIG. 2) with the ribbon cartridge RK mounted, thereby taking up the used ink ribbon IB after print formation.

Further, a ribbon take-up roller 15 is disposed on the downstream side of the print head 11 along the tape transport direction of the first opening/closing cover 8a. The ribbon take-up roller 15 guides the used ink ribbon IB to the ribbon take-up roll R5.

That is, the ink ribbon IB fed out from the ribbon supply roll R4 is disposed further on the print head 11 side of the print-receiving tape 150 sandwiched between the print head 11 and the feeding roller 12, contacting the area below the print head 11. Then, after the ink of the ink ribbon IB is transferred to the base layer 153 of the print-receiving tape 150 by the heat from the print head 11 to execute print formation, the used ink ribbon IB is taken up on the ribbon take-up roll R5 while guided by the ribbon take-up roller 15. Note that, in each figure of this application, the above described ink ribbon IB disposed on the above described rolls R4, R5 is suitably omitted (to prevent complexities in illustration), and only the roll housing part disposed so as to cover the layered structure of the wound ink ribbon IB is shown. In this case, as a matter of convenience, the roll flange part is schematically depicted using the reference numerals "R4" "R5."

Figure 4:
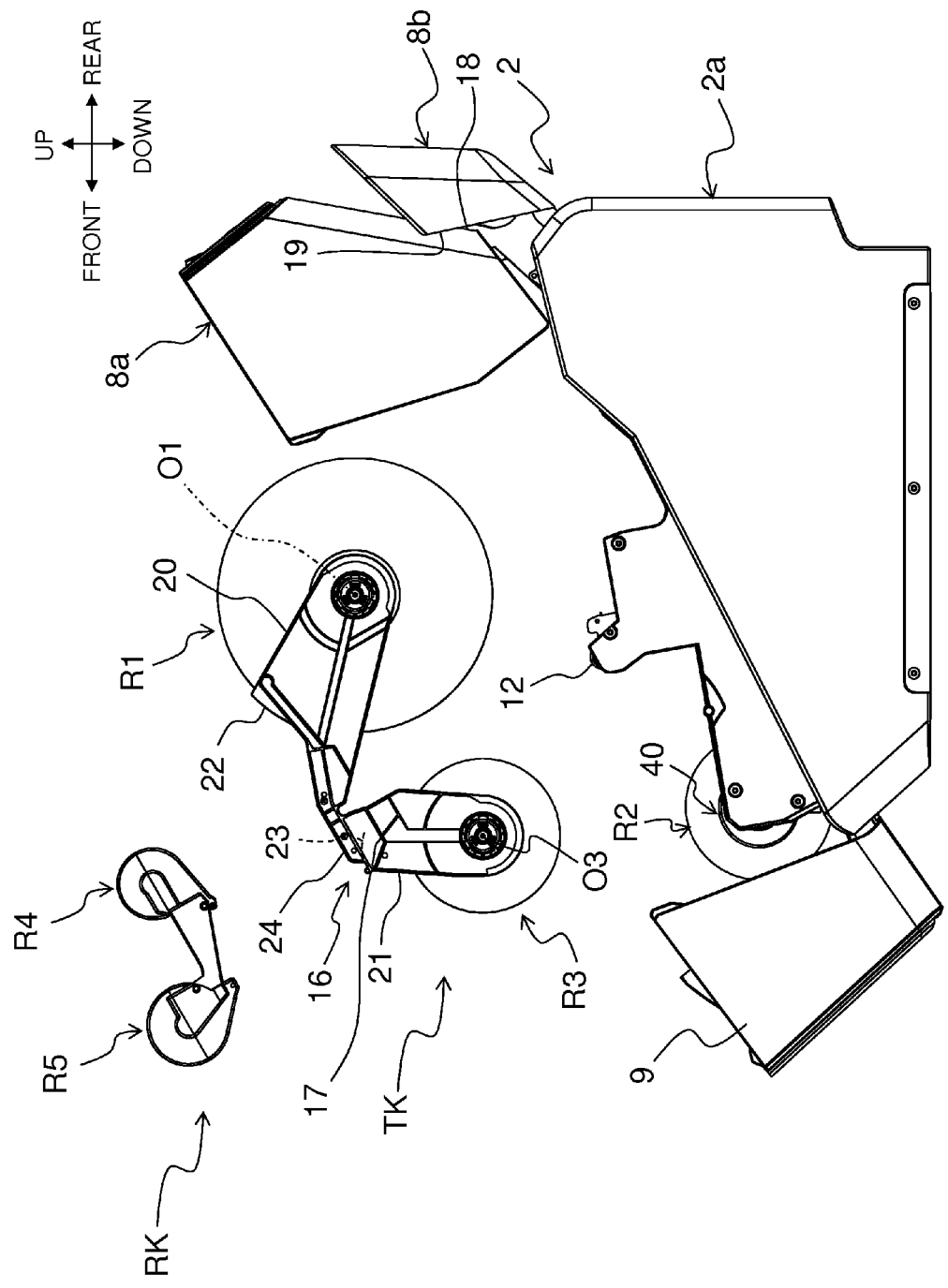
FIG. 4 is an exploded side view showing the tape printer with the first and second opening/closing covers open and the tape cartridge and ribbon cartridge removed.

The connecting arm 16 comprises a peeling part 17 which includes a substantially horizontal slit shape, for example, on the upstream side of the third roll R3 along the tape transport direction (refer to FIG. 4). The peeling part 17 is an area that peels the separation material layer 151 from the tape 150' with print fed out from the first roll R1 and fed toward the frontward side. The peeling part 17 peels the separation material layer 151 from the tape 150' with print, separating the separation material layer 151 and a tape 150'' with print made of the other layers, i.e., the base layer 153 and the adhesive layer 152. Then, the peeled separation material layer 151 is taken up and wound, forming the above described third roll R3. Further, the tape 150'' with print, from which the separation material layer 151 was peeled, is wound around an outer peripheral side of a take-up mechanism 40, forming a second roll R2 described later.

The third roll R3 is supported on the frontward side (that is, the downstream side of the first roll R1 along the tape transport direction) of the tape cartridge TK by the connecting arm 16. The third roll R3 freely rotates with the tape cartridge TK mounted to the housing main body 2a, winding the separation material layer 151 peeled from the tape 150' with print around an axis O3 (axis line) of the left-right direction. Note that, in each figure of this application, the above described separation material layer 151 disposed on the above described roll R3 is suitably omitted (to avoid complexities in illustration), and only a substantially circular roll flange part disposed so as to sandwich both width-direction sides of the separation material layer 151 is shown. In this case, as a matter of convenience, the roll flange part is schematically depicted using the reference numeral "R3."

At this time, the third roll R3 is received from above in the third storage part 5 by the mounting of the tape cartridge TK and stored with the axis O3 of the winding of the separation material layer 151 in the left-right direction. Then, the third roll R3, stored in the third storage part 5 (with the tape cartridge TK mounted), is driven by a separation sheet take-up motor M3 that is disposed in the housing main body 2a via a gear mechanism (not shown) and rotates in a predetermined rotating direction (a direction C in FIG. 2) inside the third storage part 5, thereby taking up the separation material layer 151.

Further, the above described take-up mechanism 40 for sequentially winding the tape 150'' with print, formed by the peeling of the separation material layer 151 from the tape 150' with print, is received from above in the second storage part 4 and stored so that it is supported rotatably around an axis O2, with the axis O2 of the winding of the tape 150'' with print in the left-right direction. Then, the take-up mechanism 40, stored in the second storage part 4, is driven by an adhesive take-up motor M2 that is disposed in the housing main body 2a via a gear mechanism and rotates in a predetermined rotating direction (a direction B in FIG. 2) inside the second storage part 4, taking up and layering the tape 150'' with print. With this arrangement, the tape 150'' with print is sequentially wound around the outer peripheral side of the take-up mechanism 40, forming the above described second roll R2. Note that, in each figure of this application, the above described tape 150'' with print disposed on the above described roll R2 is suitably omitted (to avoid complexities in illustration), and only a substantially circular roll flange part disposed so as to sandwich both width-direction sides of the tape 150'' with print is shown. In this case, as a matter of convenience, the roll flange part is schematically depicted using the reference numeral "R2."

Further, a pressure roller 37 supported in a direction facing the outer peripheral surface of the second roll R2 via a predetermined urging member is disposed on the inner surface of the frontward-side opening/closing cover 9 via a predetermined urging member. In a case where the outer diameter of the second roll R2 is sufficiently large, the tip end of the pressure roller 37 is urged toward and contacts the outer peripheral surface of the second roll R2. Note that the configuration of the above described take-up mechanism 40 and axis O2 periphery will be described later in further detail.

Overview of the Operation of the Tape Printer

Next, an overview of the operation of the tape printer 1 will be described.

That is, when the tape cartridge TK is mounted in the first predetermined position 13, the first roll R1 is stored in the first storage part 3 positioned on the rearward side of the housing main body 2a, and the third roll R3 is stored in the third storage part 5 positioned on the frontward side of the housing main body 2a. Further, the take-up mechanism 40 for forming the second roll R2 is stored in the second storage part 4 positioned on the frontward side of the housing main body 2a.

At this time, when the feeding roller 12 is driven, the print-receiving tape 150 fed out by the rotation of the first roll R1 stored in the first storage part 3 is fed to the frontward side. Then, desired print is formed on the base layer 153 of the fed print-receiving tape 150 by the print head 11, thereby forming the tape 150' with print. When the tape 150' with print on which print was formed is further fed to the frontward side and fed to the peeling part 17, the separation material layer 151 is peeled at the peeling part 17. The peeled separation material layer 151 is fed to the downward side, introduced to the third storage part 5, and wound inside the third storage part 5, forming the third roll R3.

On the other hand, the tape 150'' with print from which the separation material layer 151 was peeled is further fed to the frontward side, introduced to the second storage part 4, and wound around the outer peripheral side of the take-up mechanism 40 inside the second storage part 4, thereby forming the second roll R2. At that time, a cutter mechanism 30 (refer to FIG. 6 described later) disposed on the frontward-side opening/closing cover 9 further on the rearward side than the second roll R2, that is, on the upstream side of the second roll R2 along the tape transport direction, cuts the tape 150'' with print on which print was formed and from which the separation material layer 151 was peeled. With this arrangement, the tape 150'' with print wound around the second roll R2 can be cut based on a timing desired by the user and the second roll R2 can be removed from the second storage part 4 after cutting.

Detailed Structure of Each Component

Next, the detailed structure of each component of the tape printer 1 will be described in order.

Tape Cartridge

Figure 5:
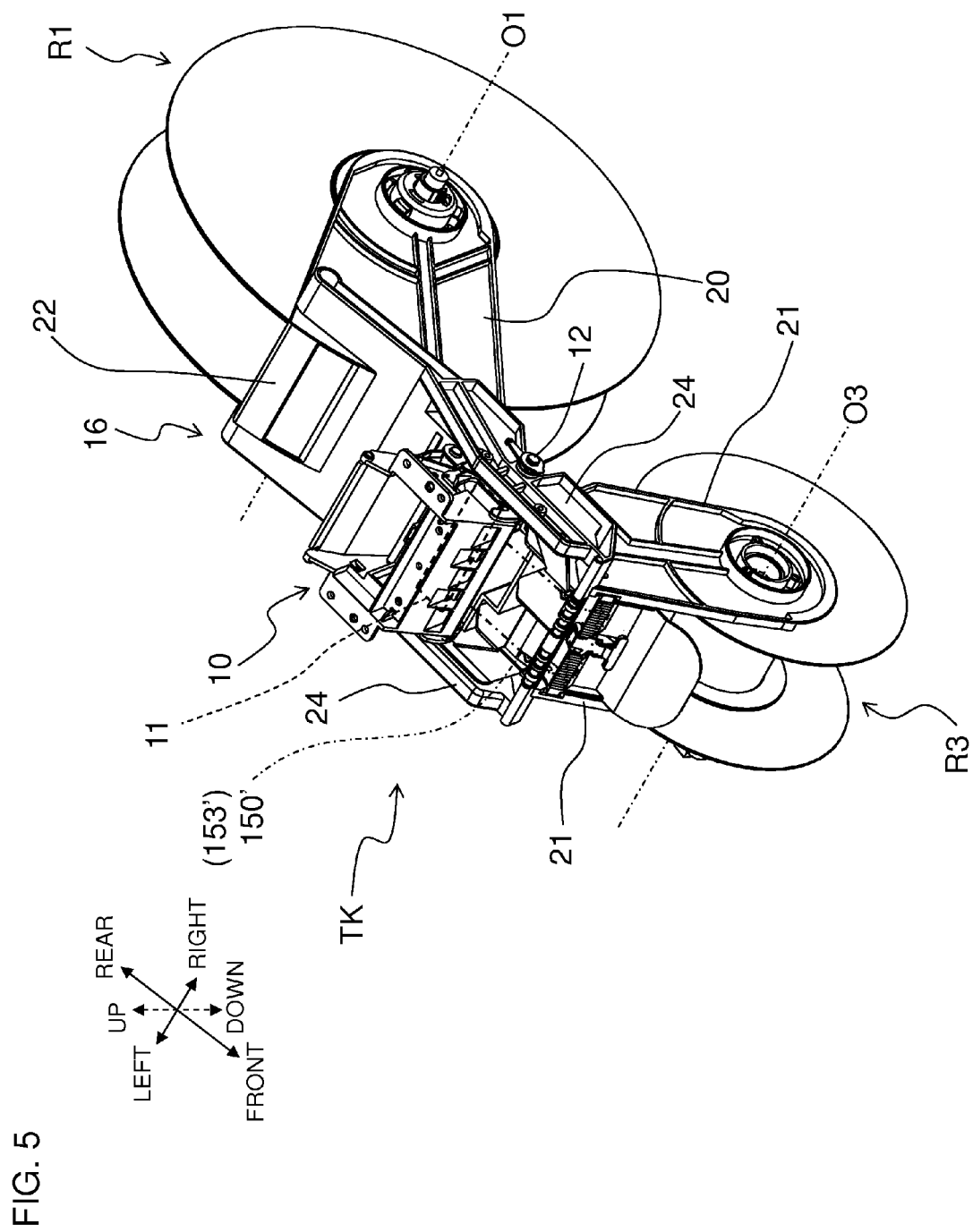
FIG. 5 is a perspective view showing the overall configuration of the tape cartridge.

In FIG. 5 and the above described FIG. 4, the tape cartridge TK comprises the first roll R1, the third roll R3, and the connecting arm 16, as previously described. The connecting arm 16 comprises a pair of left and right first bracket parts 20, 20 disposed on the rearward side, and a pair of left and right second bracket parts 21, 21 disposed on the frontward side. Note that, in FIG. 5, as already noted, the print-receiving tape 150 wound around the axis O1 on the first roll R1, and the separation material layer 151 wound around the axis O3 on the third roll R3 are not shown, and the members comprising the first roll R1 and the third roll R3 are partially shown.

The first bracket parts 20, 20 are set so that the first roll R1 is sandwiched by both the left and right sides along the axis O1, holding the first roll R1 rotatably around the axis O1 with the tape cartridge TK mounted to the housing main body 2a. These first bracket parts 20, 20 are connected by a first connecting part 22 that is extended substantially along the left-right direction on the upper end, avoiding interference with the outer diameter of the first roll R1.

The second bracket parts 21, 21 are set so that the third roll R3 is sandwiched by both the left and right sides along the axis O3, holding the third roll R3 rotatably around the axis O3 with the tape cartridge TK mounted to the housing main body 2a. These second bracket parts 21, 21 are connected by a second connecting part 23 extended substantially along the left-right direction on the upper end.

Then, the first bracket parts 20, 20 and the first connecting part 22 on the rearward side, and the second bracket parts 21, 21 and the second connecting part 23 on the frontward side are coupled by a pair of left and right roll coupling beam parts 24, 24.

Hence, as previously described, when the tape cartridge TK is used, the print-receiving tape 150 is fed out from the first roll R1 and fed, thereby consuming the print-receiving tape 150. On the other hand, the separation material layer 151, which was peeled by the above described peeling part 17 from the tape 150' with print on which print was formed after the feeding of the print-receiving tape 150, is wound around the axis O3 on the third roll R3.

Detailed Structure of Cutter Mechanism

Figure 7:
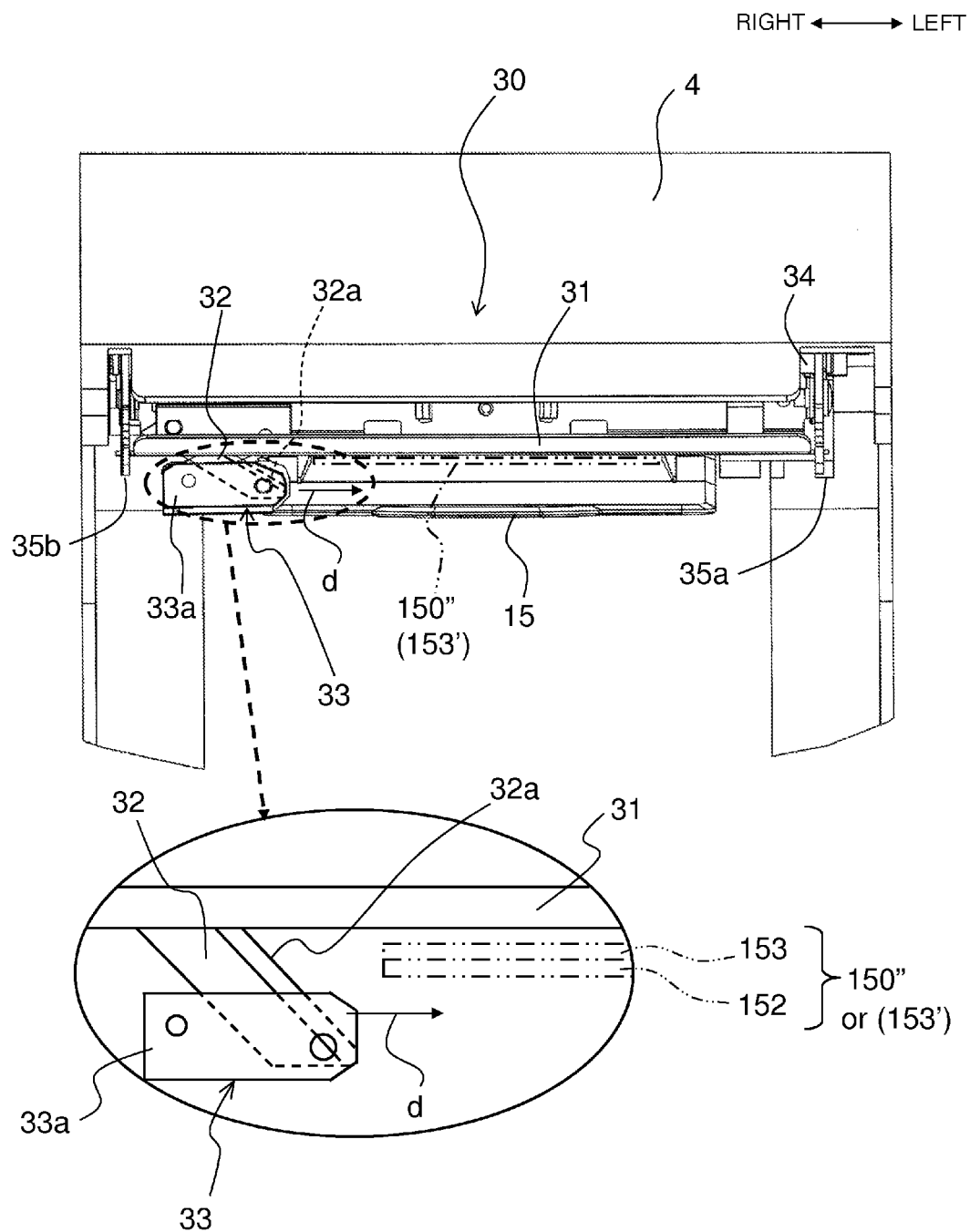
FIG. 7 is a diagram showing the cutter mechanism.

As shown in FIGS. 6 and 7, the cutter mechanism 30 comprises a guide plate 31, a movable blade 32, a carriage 33 comprising a movable blade support part 33a that supports the movable blade 32, and a guide rail 34.

The guide plate 31 is extended along the tape-width direction to the inside of the releasing edge side of the second opening/closing cover 4, further on the downstream side in the tape transport direction than the feeding roller 12. This guide plate 31 is supported by a pair of left and right support plates 35a, 35b with respect to the second opening/closing cover 4. Then, the guide plate 31 contacts the upper surface of the tape 150" with print (in other words, the upper surface of the base layer 153) fed by the feeding roller 12 inside the above described housing 2 in a posture in which the tape-width direction is the left-right direction and guides the tape 150" with print (refer to the imaginary lines in FIG. 7).

The above described movable blade 32 is disposed below the guide plate 31 so that a blade edge 32a faces the guide plate 31 in the up-down direction (so that the blade edge 32a points upward in this example). The movable blade 32 is guided by the guide rail 34, traveling in the tape-width direction along the guide plate 31 by the above described carriage 33 that is made to travel by the driving of the cutter motor (not shown), and performs cutting (refer to arrow d in FIG. 7). The above described guide rail 34 is supported by the above described pair of left and right support plates 35a, 35b with respect to the second opening/closing cover 4.

The movable blade 32 advances from the adhesive layer 152 of the lowermost layer toward the tape 150" with print, while sandwiching the tape 150" with print between itself and the guide plate 31 by the above described travel of the carriage 33 along the guide rail 34, performing the above described cutting. At that time, the above described movable blade support part 33a supports the carriage 33 so that the movable blade 32 slopes toward the above described travel direction along the tape width, in a way that causes the blade edge 32a (refer to FIG. 7) of the movable blade 32 to press the tape 150" with print toward the guide plate 31 direction (slopes downward in this example). With this arrangement, the tape 150" with print is cut in the width direction by the advancing and cutting performed by the blade edge 32a of the downward disposed, obliquely upward pointing movable blade 32 from the adhesive layer 152 of the lowermost layer, while the upper surface (specifically, the upper surface of the base layer 153 after print formation by the print head 11) is contacted and guided by the guide plate 31. A slit 31a is disposed in the tape-width direction on the guide plate 31 at this time, for guiding the travel of the movable blade 32 by the carriage 33.

Note that a shoot (not shown) for switching the feeding path of the tape 150" with print between a side toward the second roll R2 and a side toward the discharging exit (not shown) is disposed further on the downstream side than the guide plate 31 along the tape transport direction.

Overview of Peripheral Structure of Take-Up Mechanism and Axis O2

Figure 8:
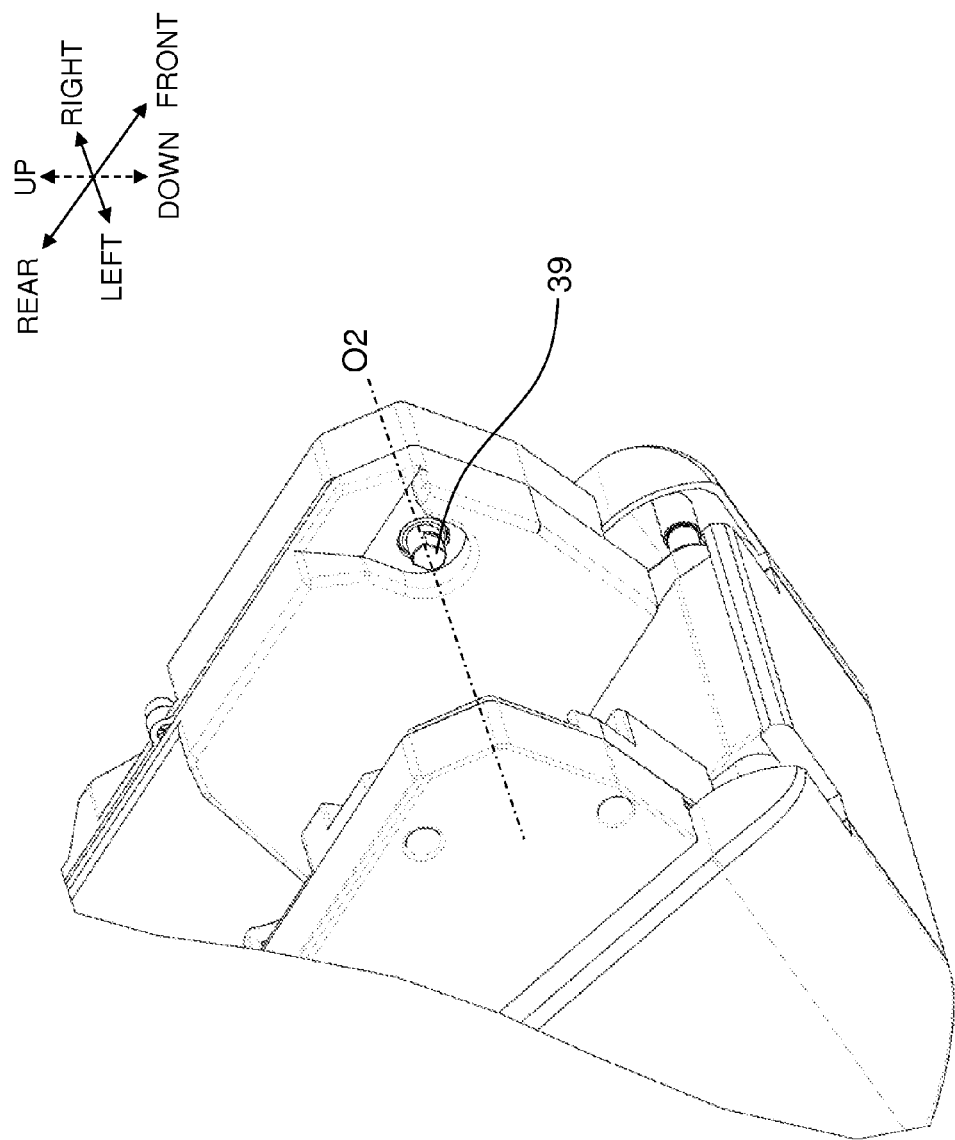
FIG. 8 is a perspective view showing the structure of the bearing part periphery.
Figure 9:
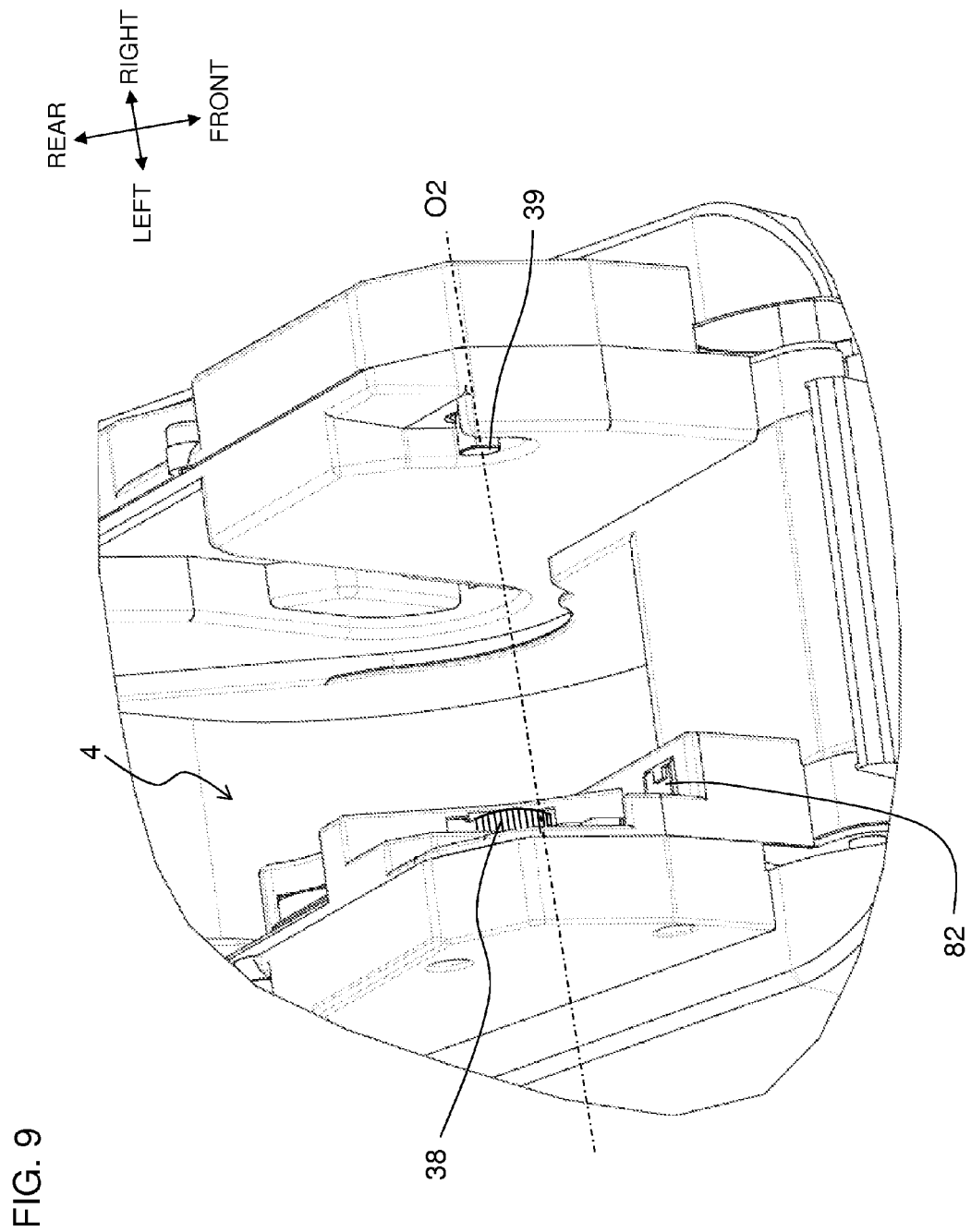
FIG. 9 is a perspective view showing the structure of the bearing part periphery.
Figure 10:
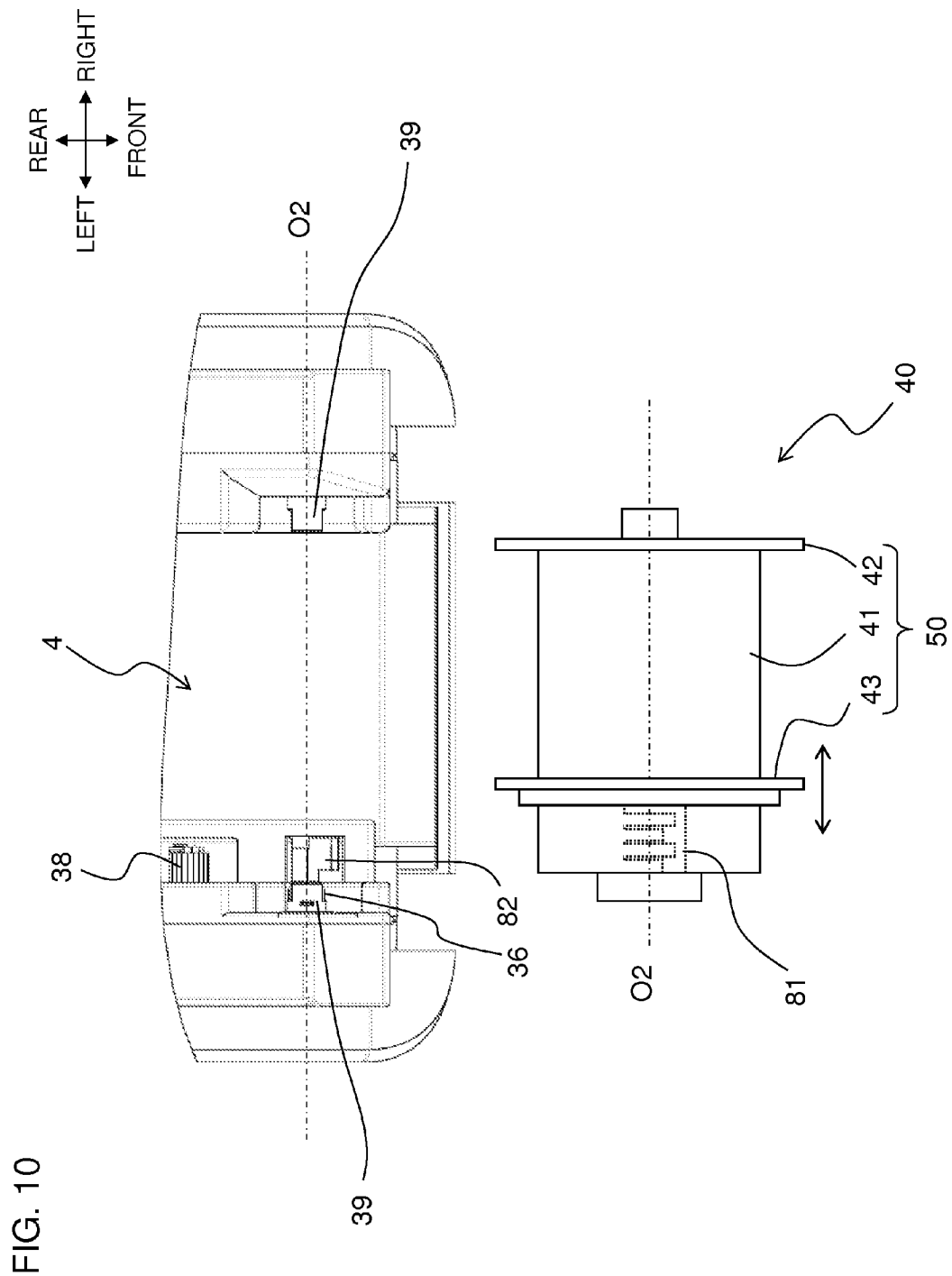
FIG. 10 is a plan view of the bearing part periphery and take-up mechanism as viewed from above.

Further, according to this embodiment, the take-up mechanism 40 is mounted to the second storage part 4 as described above, and the tape 150" with print is taken up and layered on the outer periphery side of this take-up mechanism 40, thereby forming the second roll R2. In FIGS. 8-10, two bearing parts 39 that are substantially pillar-shaped protrusions are fixed inside the second storage part 4 of the housing main body 2a facing both left and right sides along the axis O2 direction when the second roll R2 is mounted so as to sandwich the second roll R2. The respective axial ends of both axial direction sides of the take-up mechanism 40 are respectively mounted to the bearing parts 39, 39, thereby rotatably supporting the center section of the take-up mechanism 40. At this time, a drive gear 38 linked to the above described adhesive take-up motor M2 exposes a portion of the teeth surface thereof toward the bearing part 39, further downward on the rearward side than the left-side bearing part 39 of the second storage part 4 of the housing main body 2a. Note that, in FIGS. 8 and 9, the second roll R2 is not shown.

In FIG. 10, the take-up mechanism 40 is configured so that, as described later in detail, the respective axial ends of both axial direction sides are coupled to form a small diameter support shaft, passing through and rotatably supporting an axial center of a center drum part 50 around which is wound the tape 150" with print. A first outer cylinder 42 comprising a substantially circular flange is mounted to the outer periphery of the right side of the drum part 50, and a second outer cylinder 43 comprising a substantially circular flange is mounted to the outer periphery of the left side of the drum part 50. This second outer cylinder 43 is mounted movably in the axial direction (left-right direction) in a predetermined range of the left-end side of the take-up mechanism 40. With this arrangement, the first outer cylinder 42 and the second outer cylinder 43 are capable of appropriately sandwiching the tape 150" with print wound by the take-up mechanism 40 in the width direction in accordance with the tape width thereof.

A detected part 81 wherein an exposed width changes in accordance with the moved position of the above described second outer cylinder 43 is disposed in a predetermined circumferential position on the left-end side of the take-up mechanism 40. This detected part 81 is formed in a shape in which the exposed amount of the concavoconvex undulations changes in accordance with the exposed width (refer to the dashed line area in the figure). When the take-up mechanism 40 is mounted to the second storage part 4 of the housing main body 2a, it is mounted so that this detected part 81 is positioned downward. A detecting part 82 is disposed on the second storage part 4 of the housing main body 2a in a position facing the detected part 81 when the take-up mechanism 40 is mounted. While not shown particularly in detail, this detecting part 82 mechanically or optically detects the exposed amount of the concavoconvex undulations of the facing detected part 81 to identify the axial-direction position of the above described second outer cylinder 43. With this arrangement, it is possible to automatically detect the tape width of the tape 150" with print sandwiched between the first outer cylinder 42 and the second outer cylinder 43 on the tape printer 1 side, and thus further identify the type and base diameter of the second roll R2 based on this tape width.

Further, a substantially square cylinder shaped protrusion 36 is disposed in a downward neighboring position of the left-side bearing part 39 (back surface position of the bearing part 39 in FIG. 10).

Details of Take-Up Mechanism

Figure 11:
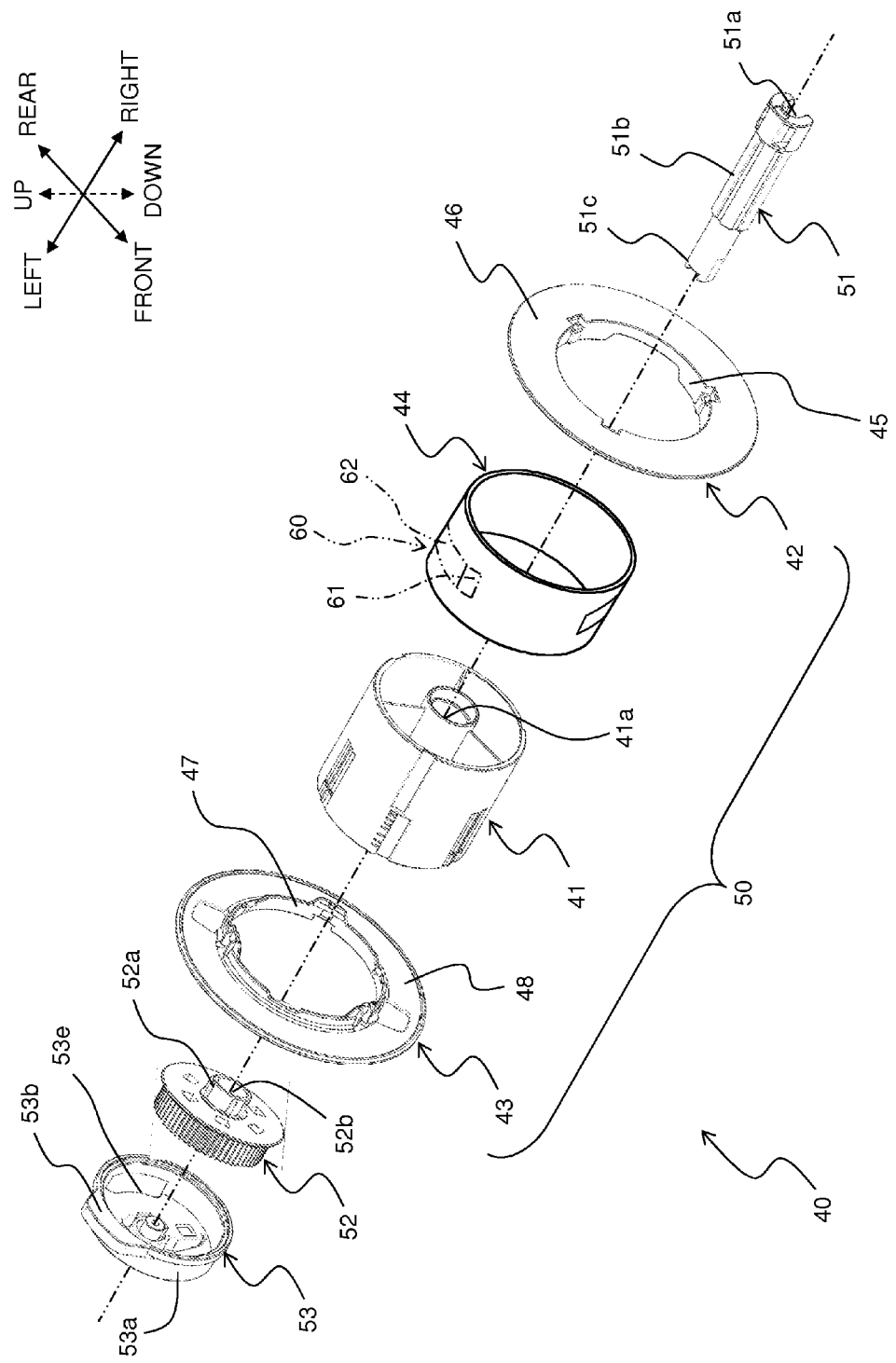
FIG. 11 is an exploded perspective view of the take-up mechanism.
Figure 12A:
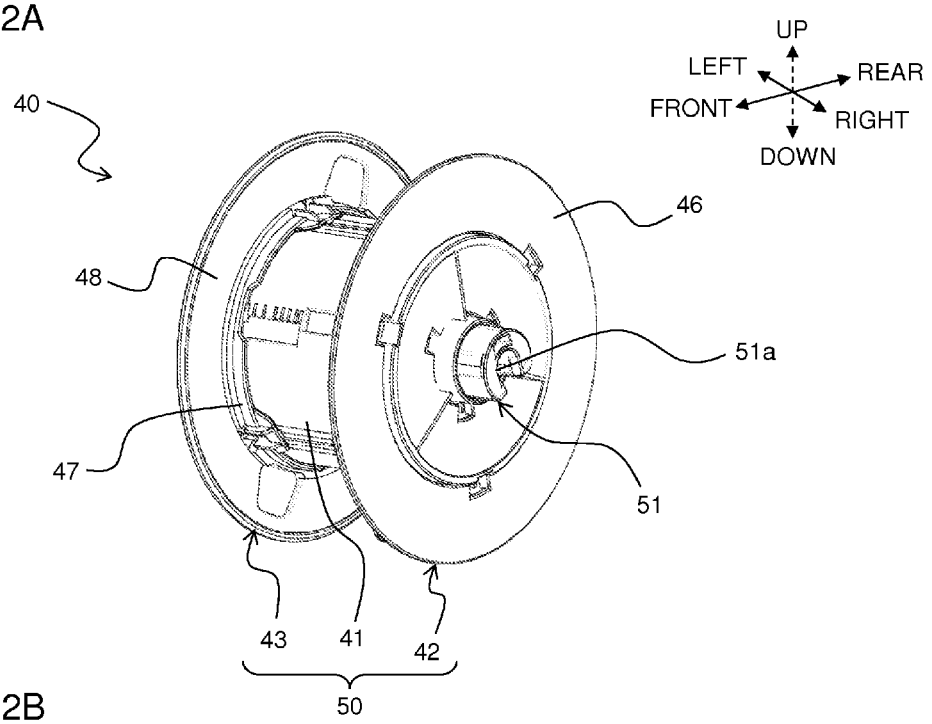
FIG. 12A is a perspective view showing the outer appearance of the fabricated take-up mechanism.
Figure 12B:
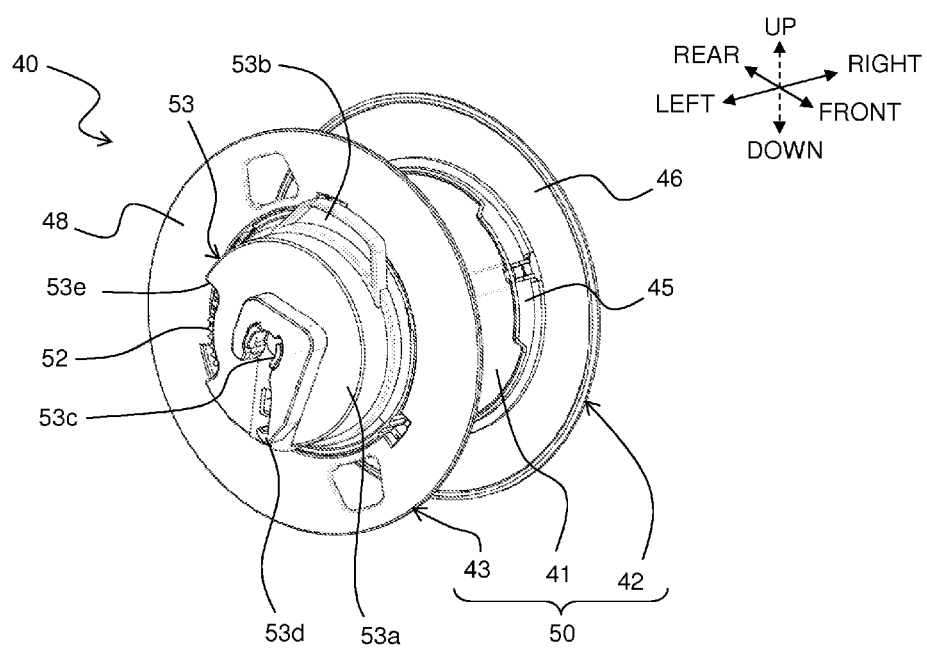
FIG. 12B is a perspective view showing the outer appearance of the fabricated take-up mechanism.

In FIG. 11 and FIG. 12, the take-up mechanism 40 comprises a substantially cylindrical inner cylinder 41 with the above described axis O2 serving as the axis, the above described first outer cylinder 42, the above described second outer cylinder 43, a shaft member 51, a driven gear 52, and a lock member 53.

The first outer cylinder 42 is detachably mounted to the outer peripheral side of one side end (specifically, the right end) along the axial direction (that is, the left-right direction, which is the direction of the axis O2) of the inner cylinder 41. This first outer cylinder 42 comprises a substantially cylindrical first cylinder part 45, and a substantially circular first flange part 46 integrally formed on the right end of the first cylinder part 45.

The second outer cylinder 43 is mounted to the outer peripheral side of the other side end (specifically, the left end) along the axial direction (that is, the left-right direction, which is the direction of the axis O3) of the inner cylinder 41. This second outer cylinder 43 comprises a substantially cylindrical second cylinder part 47, and a substantially circular second flange part 48 integrally formed on the left end of the second cylinder part 47. This second outer cylinder 43, as described above, is mounted movably in the axial direction (left-right direction) in a predetermined range of the left-end side of the take-up mechanism 40. Note that the inner cylinder 41, the first outer cylinder 42, and the second outer cylinder 43 constitute the above described drum part 50.

That is, with the first outer cylinder 42 and the second outer cylinder 43 mounted to the inner cylinder 41, the first flange part 46 and the second flange part 48 are disposed facing each other in the axial direction, forming a space capable of receiving the above described tape 150" with print between the first flange part 46 and the second flange part 48.

Further, with the first outer cylinder 42 and the second outer cylinder 43 mounted to the inner cylinder 41, the first cylinder part 45 and the second cylinder part 47 are extended substantially along the axis O2 so as to connect the first flange part 46 and the second flange part 48, and a substantially cylindrical paper core 44 is mountable to the outer peripheral side of the first cylinder part 45 and the second cylinder part 47 (in other words, in the space between the first flange part 46 and the second flange part 48). The paper core 44 is a supplying member for winding the tape 150" with print formed by the peeling of the separation material layer 151 from the tape 150' with print at the aforementioned peeling part 17 around the outer peripheral side so that the tape-width direction is in the left-right direction. Note that FIG. 12 shows the paper core 44 not mounted to the outer peripheral side of the first cylinder part 45 and the second cylinder part 47 (the same for the above described FIG. 10 as well).

The shaft member 51 is a substantially pillar-shaped member overall, comprising a first engaging part 51a mountable to the above described bearing part 39 disposed in the housing main body 2a on the right-side end, as well as a shank part 51b with a diameter smaller than the first engaging part 51a in the axial-direction center area, and a shaft coupling part 51c on the left-side end. A through-hole 41a is disposed in the axial center of the inner cylinder 41, and the shank part 51b of the shaft member 51 is inserted through this through-hole 41a, thereby causing the inner cylinder 41 to be rotatably supported by the shaft member 51.

The driven gear 52 is a gear capable of meshing with the drive gear 38 disposed on the second storage part 4 of the housing main body 2a, and an inserted cylinder 52a constituting a key on the outer peripheral surface is disposed in the center of the right-side end surface thereof. This inserted cylinder 52a is inserted through a left-end opening of the through-hole 41a of the inner cylinder 41, making it possible for the driven gear 52 and the inner cylinder 41 (as well as the first outer cylinder 42 and the second outer cylinder 43) to integrally rotate. Note that a through-hole 52b is also formed in the axial center of the entire driven gear 52, including the inserted cylinder 52a, and the left end of the above described shaft member 51 can be inserted through the coupled inner cylinder 51 and driven gear 52.

The lock member 53 comprises a substantially cup-shaped cover part 53a capable of containing the entire above described driven gear 52 in its interior, an operation part 53b disposed in a predetermined circumferential position on the outer periphery of this cover part 53a, a second engaging part 53c disposed in an axial center position on the left-side end surface of the cover part 53a, and a hook part 53d disposed near this second engaging part 53c. Further, the axial center position of the inner side surface of this lock member 53 (the right-side end surface of the cover part 53a) can be detachably coupled to the shaft coupling part 51c of the left end of the above described shaft member 51. Further the second engaging part 53c of the lock member 53 can be mounted to the above described bearing part 39 disposed in the housing main body 2a in the same manner as the above described first engaging part 51a of the shaft member 51. Further, an exposure hole 53e that exposes a portion of the teeth surface of the above described driven gear 52 is disposed in the predetermined circumferential position of the cover part 53a. Note that a tape piece 60 will be described later.

Fabrication Procedure of Take-Up Mechanism

An example of the fabrication procedure of the take-up mechanism 40 of the above described configuration will now be described. That is, when the take-up mechanism 40 is fabricated, first the second cylinder part 47 of the second outer cylinder 43 is inserted in the outer peripheral side of the left end of the inner cylinder 41. At this point in time, the paper core 44 is not yet mounted to the outer peripheral side of the second cylinder part 47, and the second outer cylinder 43 that includes the second flange part 48 is movable in the left-right direction as described above. Then, the left end of the paper core 44 is caused to lightly fit together with the outer peripheral side of the second cylinder part 47 while contacting a right-end surface 48a of the second flange part 48 of the second outer cylinder 43. At this time, the second outer cylinder 43 is moved in the left-right direction in accordance with the width-direction dimension of the paper core 44, thereby making it possible to position the axial direction position of the paper core 44. When the paper core 44 is fully mounted to the outer peripheral side of the second cylinder part 47, the second outer cylinder 43 that includes the second flange part 48 becomes fixed to the outer peripheral side of the inner cylinder 41 and is no longer movable in the left-right direction. Then, the first outer cylinder 42 that includes the first flange part 46 is detachably mounted to the outer periphery of the right end of the inner cylinder 41 where the paper core 44 exists on the outer peripheral side. At this time, the right end of the paper core 44 is positioned by the first flange part 46 so as to contact a left-end surface 46a of the first flange part 46 of the first outer cylinder 42.

Furthermore, the driven gear 52 is mounted to the left end of the inner cylinder 41 and covered by the lock member 53. Then, the shaft coupling part 51c and the shank part 51b of the shaft member 51 are inserted through the through-hole at the axial center of the driven gear 52 and the inner cylinder 41 integrally coupled, and the tip end of the shaft coupling part 51c is detachably coupled to the inner surface of the lock member 53. With the above, the take-up mechanism 40 is fabricated (refer to FIG. 12A and FIG. 12B). In this fabricated state, the inner cylinder 41, the first outer cylinder 42, the second outer cylinder 43, the paper core 44, and the driven gear 52 are integrally coupled, and the shaft member 51 and the lock member 53 are integrally coupled. The torque transmitted to the driven gear 52 is transmitted to the inner cylinder 41, the first outer cylinder 42, the second outer cylinder 43, and the paper core 44, causing them to rotate with respect to the shaft member 51 and the lock member 53.

Then, with the first engaging part 51a of the shaft member 51 and the second engaging part 53c of the lock member 53 mounted so as to be respectively supported by the above described two bearing parts 39, 39, the entire take-up mechanism 40 is stored in the aforementioned second storage part 4. Then, the driven gear 52 meshes with the drive gear 38, and take-up of the above described tape 150" with print is performed. That is, the entire take-up mechanism 40, mounted to the bearing part 39, rotates around the axis O2 while the tape 150" with print is sequentially wound around the outer peripheral side of the paper core 44. With this arrangement, the tape 150" with print is sequentially wound around and layered on the outer peripheral side of the paper core 44, forming the above described second roll R2. Note that, since the paper core 44 is incorporated in the take-up mechanism 40 as a portion of the drum part 50 as previously described, the paper core 44, in other words, is rotatably mounted with respect to the bearing part 39 via the inner cylinder 41, the shaft member 51, and the like.

Note that the take-up mechanism 40 can be repeatedly disassembled and assembled with all members intact, including the paper core 44 as well. With this arrangement, after the tape 150" with print is sequentially introduced into the space between the above described first flange part 46 and the second flange part 48 and layered on the paper core 44 mounted to the first cylinder part 45 and the second cylinder part 47 to form the second roll R2 with the rotation of the take-up mechanism 40, the take-up mechanism 40 can be disassembled in its entirety to remove the second roll R2 only.

Control System

Next, the control system of the tape printer 1 will be described using FIG. 13. In FIG. 13, the tape printer 1 comprises a CPU 212 that constitutes a computing part that performs predetermined computations. The CPU 212 is connected to a RAM 213 and a ROM 214. The CPU 212 performs signal processing in accordance with a program stored in advance in the ROM 214 while utilizing a temporary storage function of the RAM 213, and controls the entire tape printer 1 accordingly. At this time, a control program for executing tape production processing described later is stored in the ROM 214. This CPU 212 is connected to a motor driving circuit 218 that controls the driving of the above described feeding motor M1 that drives the above described feeding roller 12, a motor driving circuit 219 that controls the driving of the above described adhesive take-up motor M2 that drives the above described second roll R2, a motor driving circuit 220 that controls the driving of the above described separation sheet take-up motor M3 that drives the above described third roll R3, a print head control circuit 221 that controls the conduction of the heating elements of the above described print head 11, and a motor driving circuit 222 that controls the driving of the above described cutter motor M4 that causes the movable blade 32 of the above described cutter mechanism 30 to travel.

Furthermore, a display part 215, an operation part 216, two optical sensors 223, 224 respectively corresponding to the second roll R2 and the third roll R3, and a PC 217 are connected to the CPU 212. The PC 217 is a general personal computer, and edits and generates print data to be printed by the tape printer 1 by executing a print data editing application described later.

The RAM 213 comprises an image buffer 213a that expands and stores dot pattern data for printing print data of an image data format received from the PC 217 in a print area of the above described print-receiving tape 150. The CPU 212 performs repeated printing (described later in detail) by the print head 11 via the print head control circuit 217 in accordance with the print data stored in the image buffer 213a and executes tape production processing that produces an adhesive tape while feeding out the print-receiving tape 150 by the feeding roller 12, according to a control program stored in the ROM 214.

Repeated Printing

Figure 14:
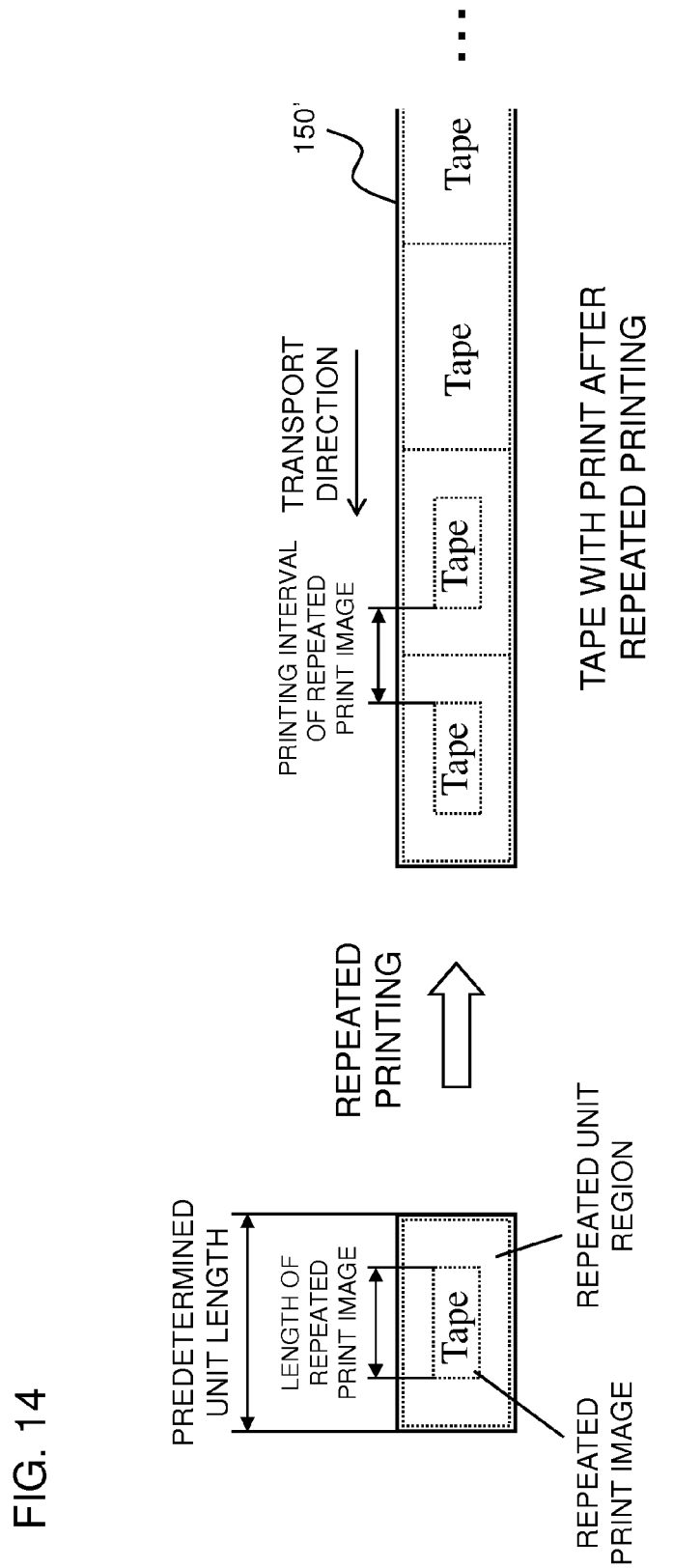
FIG. 14 is a diagram showing the repeated printing of a repeated print image.

Next, in this embodiment, the repeated printing performed by the above described tape printer 1 will be described. The tape printer 1 is capable of forming print on the print-receiving tape 150 across a length that extends as far as a few dozen meters, and taking up the tape 150' with print on the second roll R2, as described above. When printing on a long print-receiving tape 150 in this manner, the data amount becomes extensive when the print data across the entire length thereof is simply generated. Hence, according to this embodiment, a repeated unit region separated by a predetermined unit length along the transport direction of the print-receiving tape 150 is set as shown in FIG. 14, and repeated printing that continuously repeatedly prints the print data set in this rectangular repeated unit region is performed. The print data editing application executed on the PC 217 edits and generates the print data to be printed by such repeated printing.

In performing this repeated printing, a repeated print image that is printed in the above described repeated unit region needs to be generated and the position (predetermined position) where the repeated print image is to be printed in the repeated unit region needs to be set. In the example shown, settings are set so that the repeated print image is generated based on the text of the character string "Tape" set to a predetermined font, point size, and the like, and printed in a center position of the repeated unit region. Note that, the repeated print image may also be generated based on something other than such text shown in the example, allowing generation based on image data, such as a geometric graphic, photo image, or the like, for example. Further, the spacing of the printing of the repeated print image along the transport direction may also be regulated based on position settings. The print data editing application can thus automatically set an appropriate predetermined unit length of the repeated unit region based on the length and spacing of the repeated print image along the transport direction. Hence, the predetermined unit length is set longer than the transport-direction length of the repeated print image.

Figure 15:
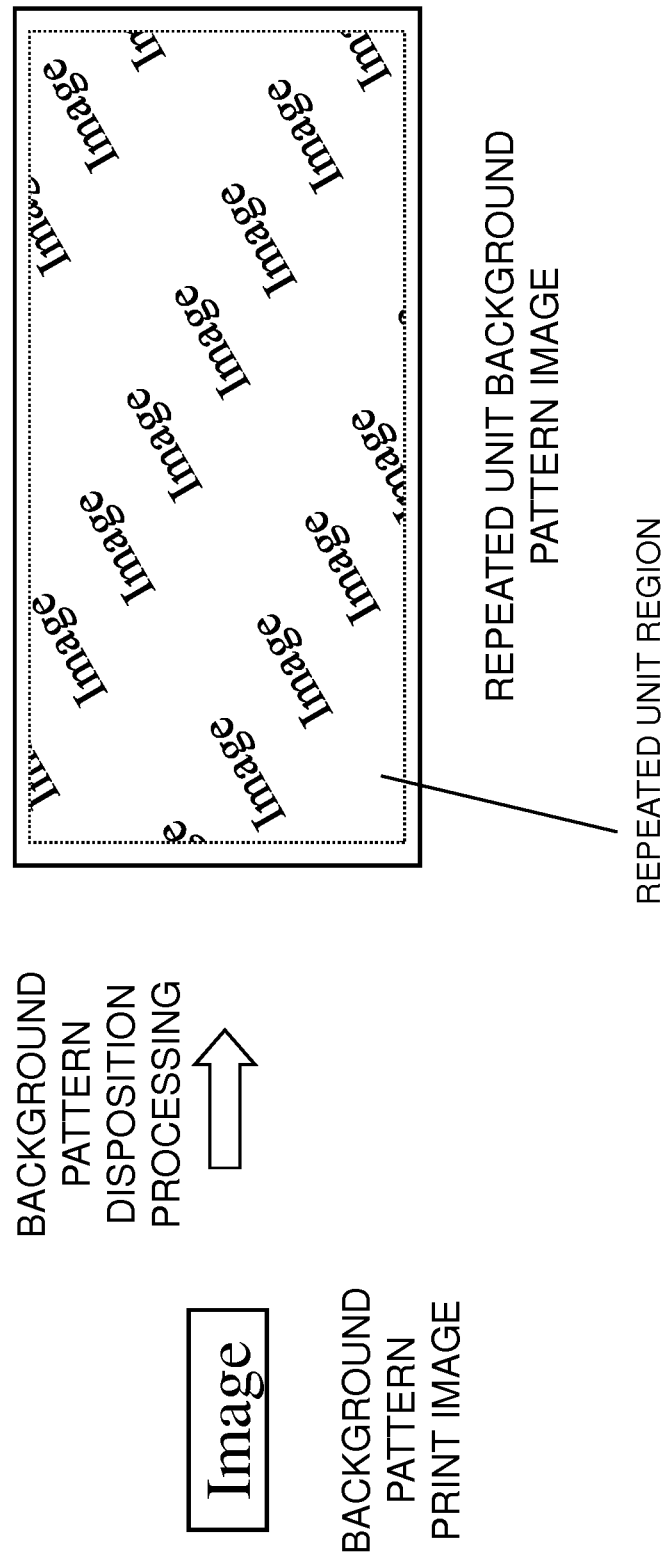
FIG. 15 is a diagram showing the repeated printing of a repeated unit background pattern image.

Further, the repeated printing in this embodiment prints the above described repeated print image as well as a repeated unit background pattern image such as shown in FIG. 15 on a per repeated unit region basis. This repeated unit background pattern image is an image that respectively disposes the same background pattern print image in a plurality of regularly disposed locations in the repeated unit region. The repeated unit background pattern image is repeatedly printed on the print-receiving tape 150, making it possible to uniformly print a decorative background design across the entire length of the tape 150' with print.

Figure 16:
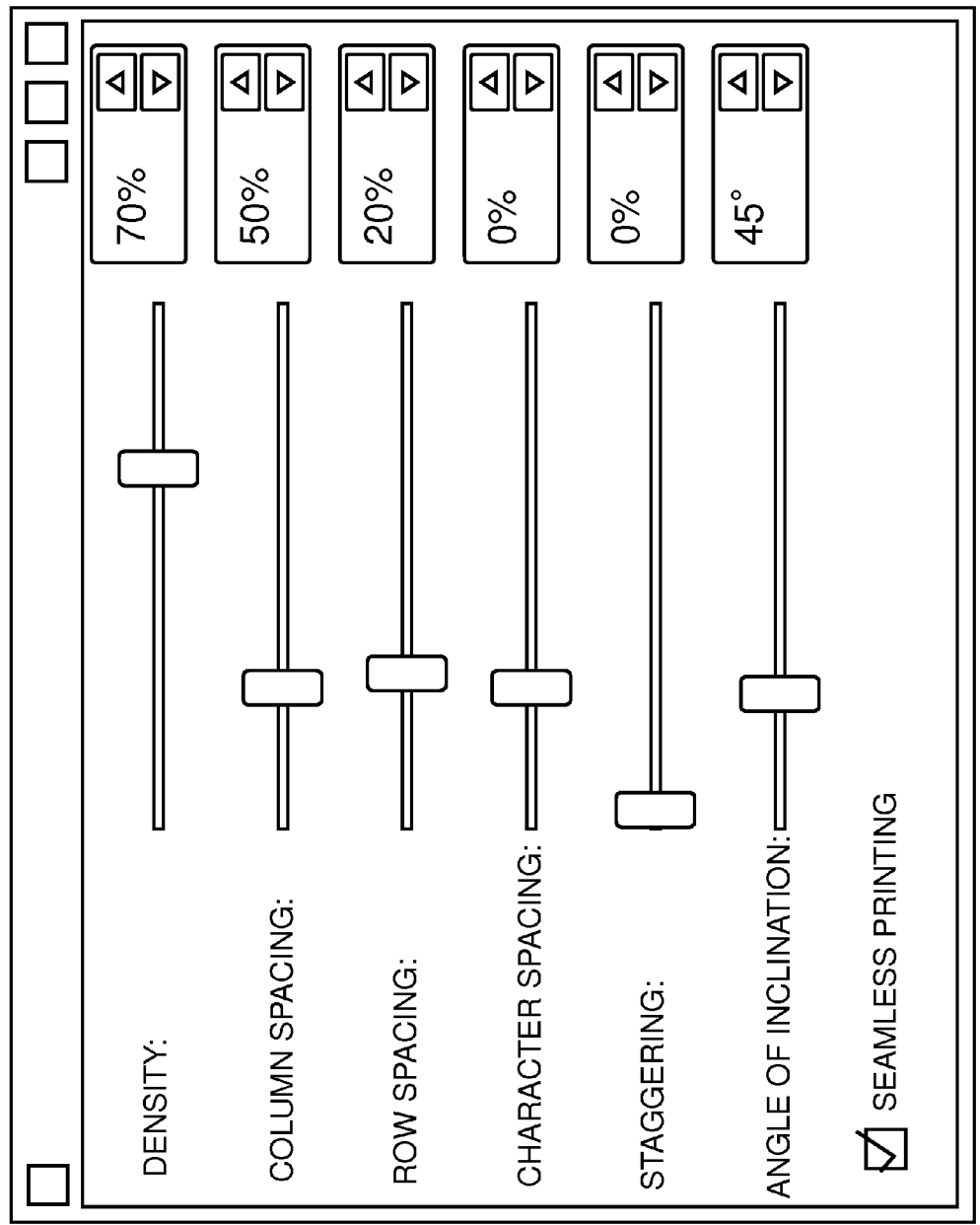
FIG. 16 is a diagram showing the setting screen for setting the regular disposition in the repeated unit background pattern image.

The print data editing application executed on the PC 217, for example, displays a setting screen such as shown in FIG. 16 on the display of the PC 217, and the user arbitrarily performs an operation input to set the above described regular disposition. In the example shown, settings related to the printing density, column spacing, row spacing, character spacing, staggered distance, row-direction angle of inclination with respect to the transport direction, seamless or non-seamless printing, and the like of the repeat unit background pattern image are arbitrarily input for the background pattern print image generated based on the text of the character string "Image" (the generation screen is not shown).

Figure 17:
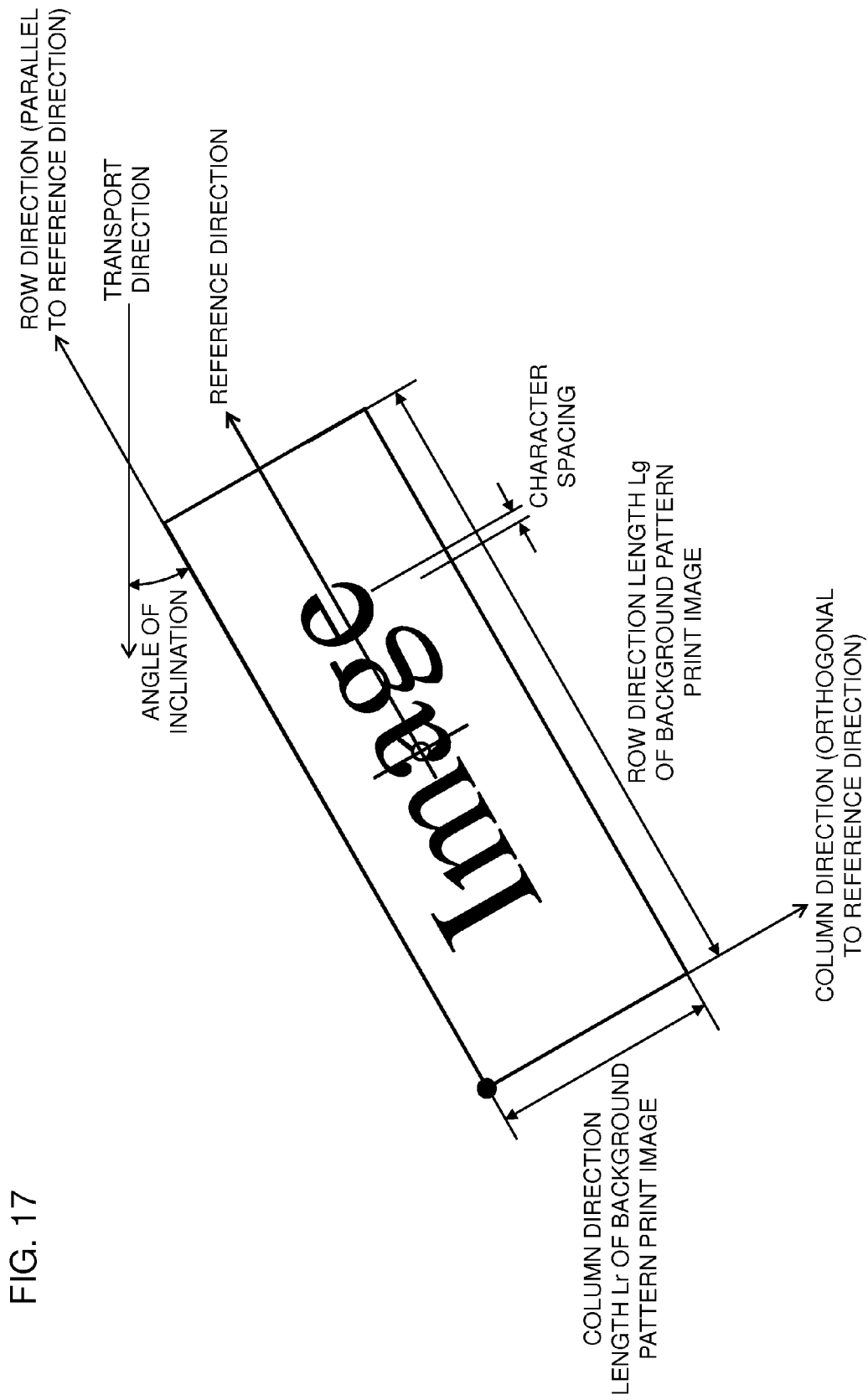
FIG. 17 is a diagram explaining the regular disposition setting parameters.

The regular disposition setting parameters will now be described in detail. FIG. 17 shows a single background pattern print image of a mode that is in accordance with a regular disposition, extracted and enlarged. In this FIG. 17, first a direction that is to serve as a reference in relation to the direction in which the background pattern print image is to be disposed is initially set for the background pattern print image. In the example shown, the background pattern print image is based on character string text, and thus the reference direction of the disposed direction is automatically set in the direction in which the characters are sequentially written. Note that this background pattern print image may also be generated using a graphic or image data other than text and, in such a case, the reference direction may be automatically set in a predetermined direction (rightward, for example) on the generated screen (not particularly shown).

The row direction in the background pattern image is a direction parallel with the reference direction, and the column direction is a direction orthogonal to the reference direction. That is, in the background pattern image, one row is formed with a plurality of the background pattern print images side-by-side in the row direction, and the background pattern image is formed with a plurality of rows of background pattern print images side-by-side in the column direction. At this time, the distance by which two background pattern print images adjacent in the row direction in the respective rows are separated serves as the column spacing (refer to FIGS. 20 and 21 described later). Further, the distance by which two rows adjacent in the column direction are separated serves as the row spacing (refer to FIGS. 20 and 21 described later).

The angle of inclination is the angle at which the row direction is inclined with respect to the transport direction and, in the example of this embodiment, is set at the angle of the position shown. Further, the character spacing is the distance by which the respective characters in the text that forms the background pattern print image are mutually separated. Further, a staggered distance Δt is the distance by which two adjacent rows are mutually staggered in the row direction (refer to FIG. 19).

Further, the print data editing application calculates a row-direction length Lg (length in the reference direction) and a column-direction length Lr (length in the direction orthogonal to the reference direction) when the background pattern print image is generated. Note that, in a case where the background pattern print image is based on text as in the example shown, the application calculates the lengths Lg, Lr of the respective directions taking into consideration settings such as the contents (number of characters), font, and point size of the character string of the text as well. Note that "length" and "distance" in this embodiment, including the above as well, are all expressed in units of the number of dots when the image data is expanded to the image buffer 213*a*.

Special Characteristics of this Embodiment

Figure 18:
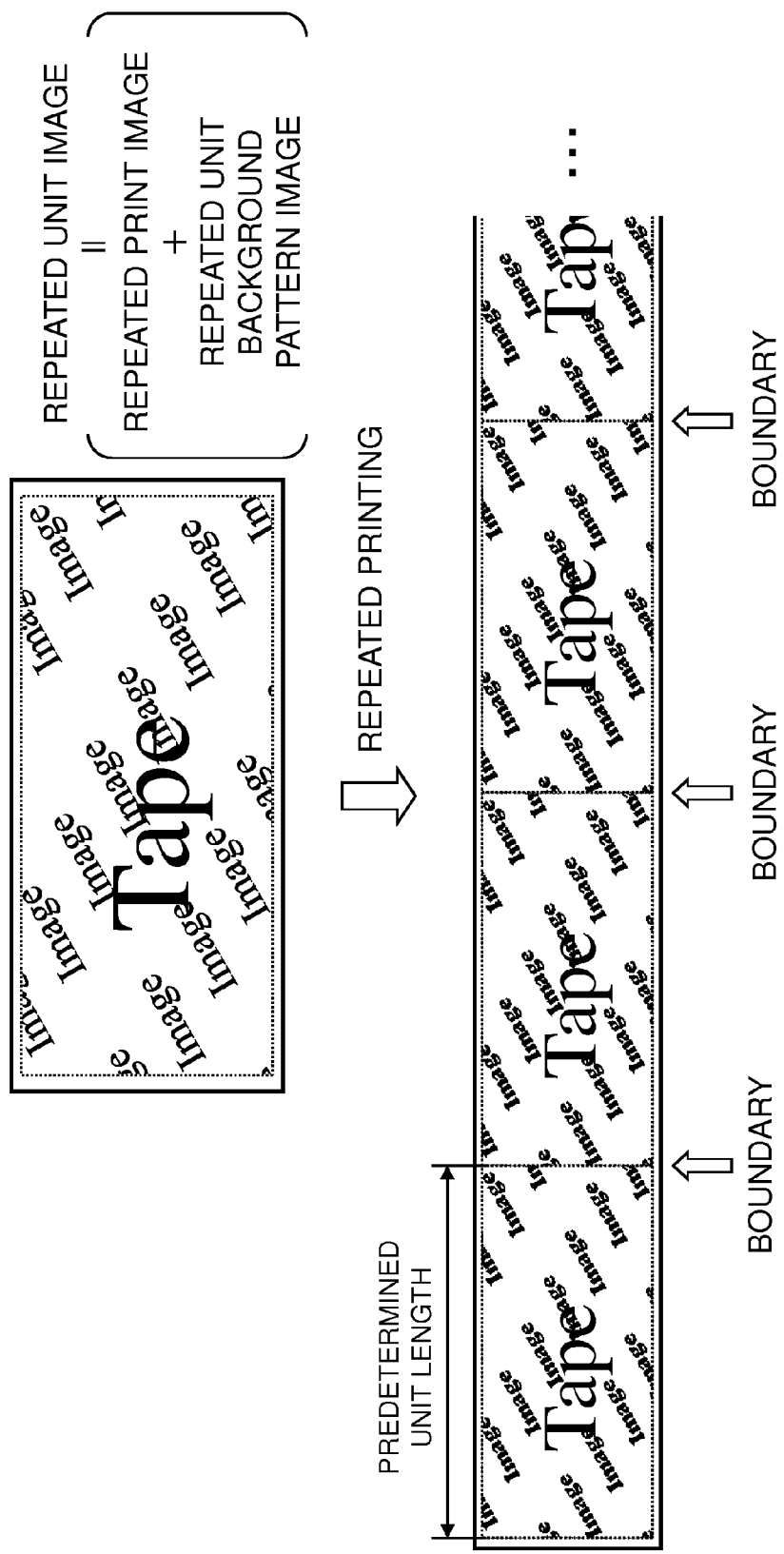
FIG. 18 is a diagram showing a case where non-seamless repeated printing is performed.

In the end, the print data editing application layers the aforementioned repeated print image ("Tape" image) and the repeated unit background pattern image ("Image" background pattern image) in the repeated unit region to generate a repeated unit image such as shown in FIG. 18. However, in a case where a repeated unit image generated in accordance with settings based on an operation input by the user is repeatedly printed as is, the print of the above described background pattern print image may become discontinuous at the boundary between two continuous repeated unit regions as shown, marring the aesthetics. This occurs due to the loss in periodicity in the disposition of the background pattern print image with respect to the predetermined unit length of the repeated unit region under the arbitrary settings of the above described regular disposition when a repeated unit background pattern image is generated.

Figure 19:
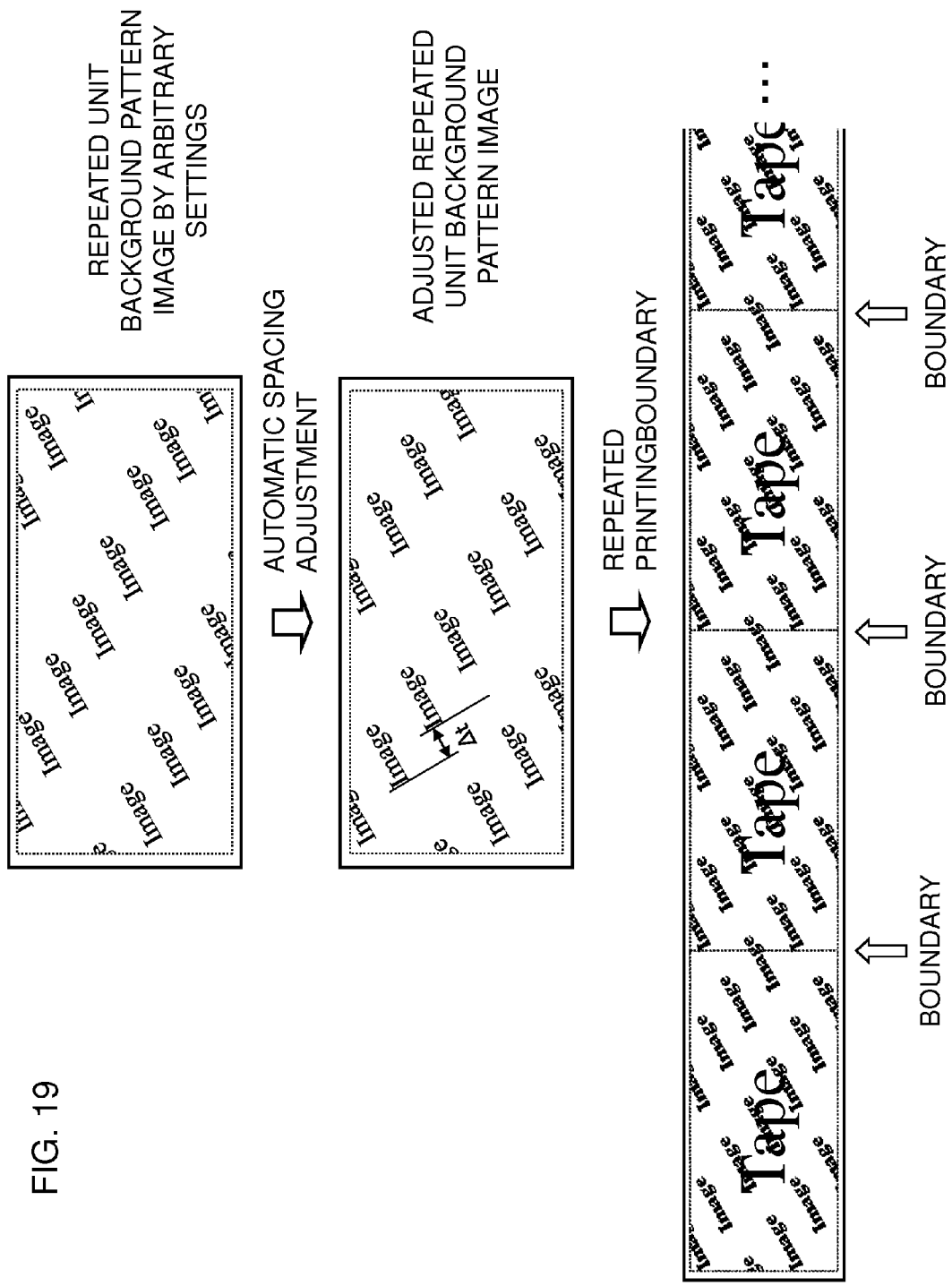
FIG. 19 is a diagram showing a case where seamless repeated printing is performed.

In response, the print data editing application in this embodiment performs seamless repeated printing such as shown in FIG. 19 in a case where the regular disposition parameters and seamless printing are set by an operation input by the user. In a case where this seamless repeated printing is performed, after the regular disposition of the background pattern print image in the repeated unit background pattern image is set by an arbitrary operation input by the user, the print data editing application automatically adjusts the setting parameters of the regular disposition so as to impart the above described periodicity with respect to a predetermined unit length. In the example of seamless printing of this embodiment, the row spacing and column spacing parameters are adjusted or approximately adjusted so as to reflect the intention of the operation input by the user in relation to the settings to the extent possible. With this arrangement, even if the edited and generated repeated unit background pattern image is repeatedly printed (seamlessly printed), the continuity of the print of the background pattern print image between repeated unit regions is maintained, making it possible to improve the aesthetics. The following describes the parameter adjustment technique of this seamless printing in order.

Adjustment Technique when the Angle of Inclination is 0°

The parameter adjustment technique of seamless printing differs according to the value of the angle of inclination. First, the adjustment technique when the angle of inclination is 0° will be described with reference to FIG. 20. Note that, in this FIG. 20 and subsequent figures, the respective background pattern unit images are shown with a frame border to clarify the disposed section.

The repeated printing performed is simply repeated printing in the transport direction. Thus, the direction in which periodicity needs to be imparted to the regular disposition of the background pattern print image in the repeated unit region is simply the transport direction of the print-receiving tape 150, that is, the direction of the predetermined unit length in the repeated unit region. The direction orthogonal to the transport direction (that is, the tape-width direction) is unproblematic regardless of how the regular disposition of the background pattern print image is set. As a result, in a case where the angle of inclination is 0°, that is, the row direction (the reference direction of the background pattern print image) is parallel with the transport direction, only the periodicity of the row direction of the regular disposition is problematic, and not the periodicity of the column direction.

For this reason, if the background pattern print image is disposed under regular disposition conditions such as shown, the periodicity with respect to the transport direction is maintained. That is, assume that the upper edge of the transport-direction starting end of a certain repeated unit region is point A, and the upper edge of the transport-direction starting end of the repeated unit region positioned immediately thereafter is point B. In such a case, even if the background pattern print image is expanded and disposed so as to cross these two repeated unit regions while maintaining the same periodicity of the regular disposition, the periodicity in the row direction is maintained if the disposition relationship between the respective points A, B and the background pattern print images positioned in the respective vicinities thereof coincide. Note that while the respective points A, B both coincide with the upper left corner point of the background pattern print image in the example shown, the respective points A, B may both coincide with a center position of the background pattern print image or the like (not shown).

Here, the row-direction length Lg of the background pattern print image is fixed. In this case, to satisfy the above described conditions, the column spacing Dr may be approximately adjusted (rounded off so as to be close to the intentions of the operation input by the user) so that the predetermined unit length Lt becomes an integer multiple of the total length of the row-direction length Lg and the column spacing Dr of the background pattern print image (that is, so that the ratio N1 between Lt and (Lg+Dr) becomes a positive integer). One possible example of a specific computation technique of this adjustment computation is to calculate (Lt−n1×Lg)/n1 and define the value rounded to the nearest whole number as a new column spacing Dr', given n1 as the maximum number of background pattern print images disposed across the predetermined unit length Lt in accordance with the regular disposition prior to adjustment. Approximately adjusting the value in this manner makes it possible to maintain periodicity with respect to the transport direction without substantially changing the number of background pattern print images disposed across the predetermined unit length from the intention of the operation input by the user.

Note that, although not particularly shown, in a case where the angle of inclination is 180°, the respective background pattern print images are simply rotated 180° and thus inverted (the reference direction becomes the opposite direction), and only column spacing adjustment needs to be performed in the same manner as described above. Further, in a case where the absolute value of the angle of inclination is 90°, that is, in a case where the angle of inclination is +90° or −90° (270°), only the column-direction and not the row-direction periodicity of the regular disposition is problematic, and thus only the row spacing Dg needs to be approximately adjusted (not shown).

Adjustment Technique when Angle of Inclination is Other than 0°

Figure 21:
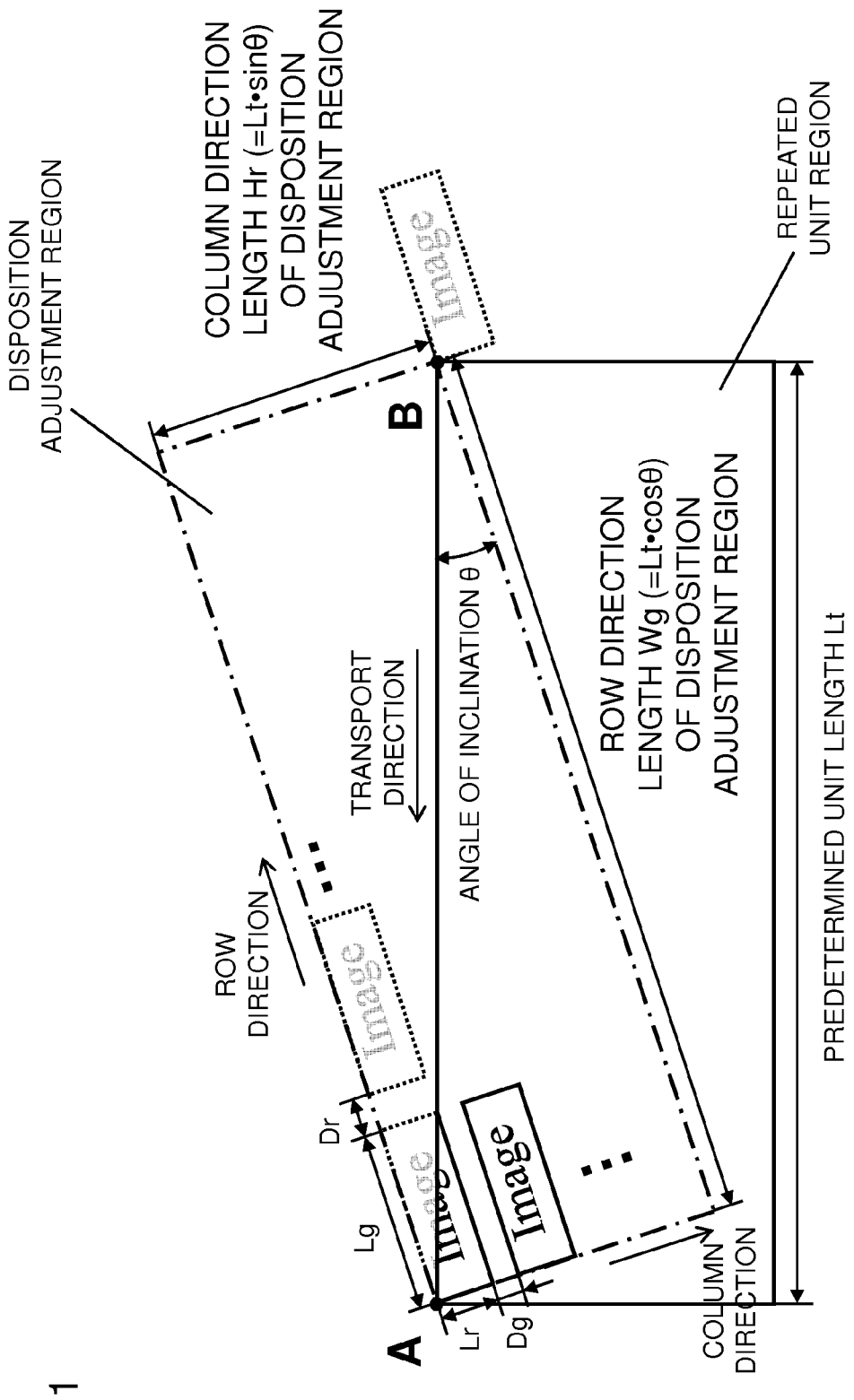
FIG. 21 is a diagram explaining the regular disposition adjustment technique in a case where the angle of inclination is other than 0°.

Next, the adjustment technique when the angle of inclination is other than 0° (more accurately, other than 0°, 90°, 180°, and 270°) will be described with reference to FIG. 21. In this case, in order to satisfy the condition that the disposition relationship between the respective points A, B and the background pattern print images in the respective vicinities thereof coincide and thus maintain periodicity in the transport direction, adjustments need to be made with both the row spacing Dg and the column spacing Dr.

In the adjustment technique of these two spacings Dg, Dr, specifically the rectangular disposition adjustment region (the region enclosed by the dashed-dotted line in the figure) enclosed by two sides parallel with the row direction (two sides parallel with the angle of inclination) and two sides parallel with the column direction (two sides orthogonal to the angle of inclination) is first set, with the predetermined unit length as the length of the diagonal.

The column spacing Dr may be approximately adjusted so that a length Wg of the sides parallel with the row direction in the disposition adjustment region becomes an integer multiple of the total length of the row-direction length Lg and the column spacing Dr of the background pattern print image (that is, so that a ratio N2 between Wg and (Lg+Dr) becomes a positive integer). The row spacing Dg may be approximately adjusted so that a length Hr of the sides parallel with the column direction in the disposition adjustment region becomes an integer multiple of the total length of the column-direction length Lr and the row spacing Dg of the background pattern print image (that is, so that a ratio N3 between Hr and (Lr+Dg) becomes a positive integer).

One possible example of a specific computation technique for the respective adjustments of the column spacing Dr and the row spacing Dg is to perform the same computation as the calculation of the column spacing Dr' in the case where the aforementioned angle of inclination is 0° for the above described disposition adjustment region instead of the repeated unit region. That is, for column spacing adjustment, the adjustment may be made by calculating (Wg−n2×Lg)/n2 and defining this value rounded to the nearest whole number as the new column spacing Dr', given n2 as the maximum number of background pattern print images disposed across the row-direction length Wg of the disposition adjustment region in accordance with the regular disposition prior to adjustment. Further, for row spacing adjustment, the adjustment may be made by calculating (Hr−n3×Lr)/n3 and defining this value rounded to the nearest whole number as a new row spacing Dg', given n3 as the maximum number of background pattern print images disposed across the column-direction length Hr of the disposition adjustment region in accordance with the regular disposition prior to adjustment.

Figure 22:
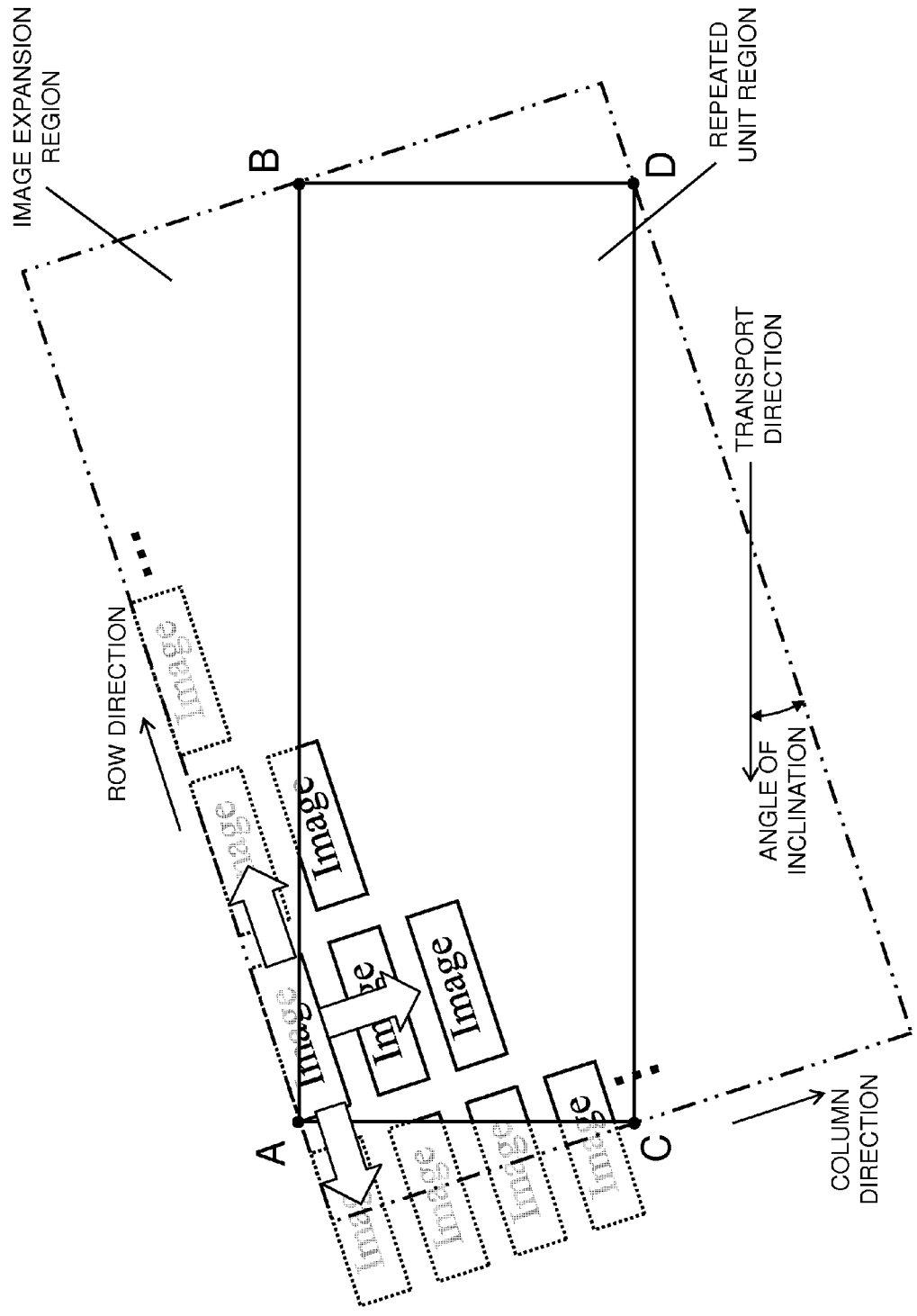
FIG. 22 is a diagram explaining the technique of expanding a background pattern print image in the image expansion region.

Note that, in a case where the angle of inclination is other than 0°, there is a high possibility that the background pattern print image may be inclined and divided near the respective edges of the rectangular repeated unit regions. To expand only the dot pattern of these background pattern print images divided in an inclined state into the image buffer 213a corresponding to the repeated unit region, it is necessary to perform complex computation processing. In order to avoid this, this embodiment sets an image expansion region such as shown in FIG. 22. This image expansion region is a rectangular region enclosed by two sides parallel with the row direction and two sides parallel with the column direction, and is set so that the four sides respectively pass through any of four vertexes A, B, C, D of the repeated unit region. By expanding the dot pattern of the background pattern print image in accordance with the adjusted regular disposition across such an image expansion region in its entirety, it is possible to easily expand all background pattern print images, including those inclined and divided, in the image buffer 213a.

Control Details of Repeated Unit Image Editing Processing

Figure 23:
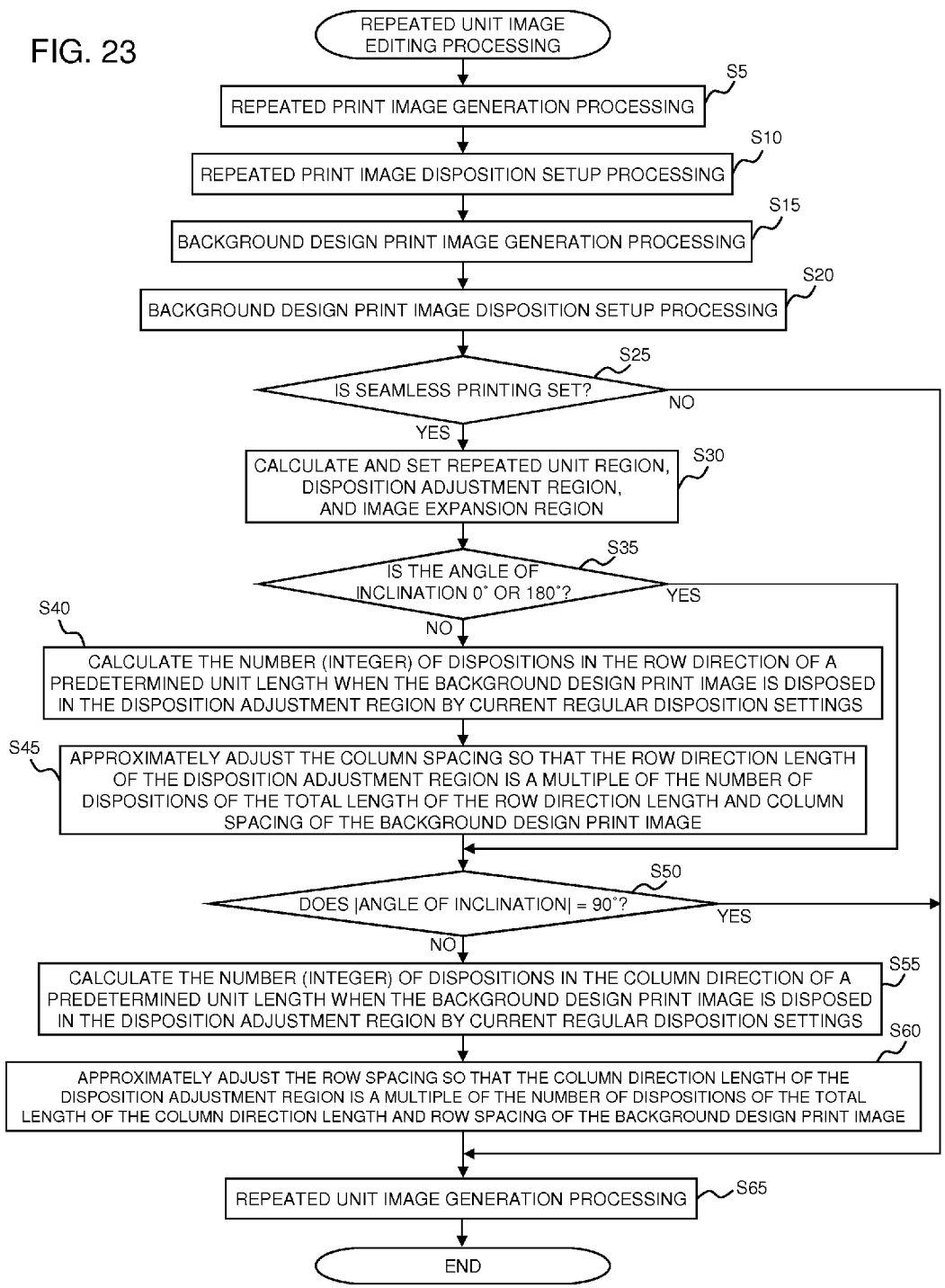
FIG. 23 is a flowchart showing the control details of the repeated unit image editing processing of the print data editing application.

Next the control details of the repeated unit image editing processing of the print data editing application executed by the CPU (not particularly shown) of the PC 217 will be described using FIG. 23. First, in FIG. 23, the flow is started by the user performing a start operation of the print data editing application, for example.

First, in step S5, the CPU of the PC 217 performs repeated print image generation processing that generates a repeated print image.

Subsequently, the flow proceeds to step S10 where the CPU of the PC 217 performs repeated print image disposition setup processing that sets the disposition of the repeated print image generated in the above described step S5. In the aforementioned example, the repeated print image is set so that it is printed in the center position of the repeated unit region, for example.

Subsequently, the flow proceeds to step S15 where the CPU of the PC 217 performs background pattern print image generation processing that generates a background pattern print image.

Subsequently, the flow proceeds to step S20 where the CPU of the PC 217 performs background pattern print image disposition setup processing that sets the regular disposition of the background pattern print image generated in the above described step S15 in accordance with the aforementioned operation input contents via the operation screen of the above described FIG. 16. In the aforementioned example, this processing sets the print density, column spacing, row spacing, character spacing, staggered distance, row-direction angle of inclination with respect to the transport direction, seamless or non-seamless printing, and the like for the repeated unit background pattern image, for example, as described above.

Subsequently, the flow proceeds to step S25 where the CPU of the PC 217 determines whether or not the setting for performing seamless printing has been made in the background pattern print image disposition setup processing of the above described step S20. If the setting has been made so that seamless printing is not performed, the condition is not satisfied and the flow proceeds to step S65 described later.

On the other hand, if the setting has been made so that seamless printing is performed, the condition is satisfied and the flow proceeds to step S30.

In step S30, the CPU of the PC 217 calculates and sets the aforementioned repeated unit region, disposition adjustment region, and image expansion region based on the settings of the above described step S10 and the above described step S20. Note that, if the angle of inclination set in the above described step S20 is 0°, +90°, 180°, and 270° (=−90°), the disposition adjustment region and the image expansion region are the same as the repeated unit region.

Subsequently, the flow proceeds to step S35 where the CPU of the PC 217 determines whether or not the set angle of inclination is 0° or 180°. If the angle of inclination is 0° or 180°, the condition is satisfied and the flow proceeds to step S50 described later.

On the other hand, if the angle of inclination set in the above described step S20 is not 0° or 180°, the condition is not satisfied and the flow proceeds to step S40.

In step S40, the CPU of the PC 217 calculates the number (n1, n2: integers) of background pattern print images disposed in the row direction of a predetermined unit length in a case where the background pattern print image is disposed in the disposition adjustment region under current regular disposition settings.

Figure 20:
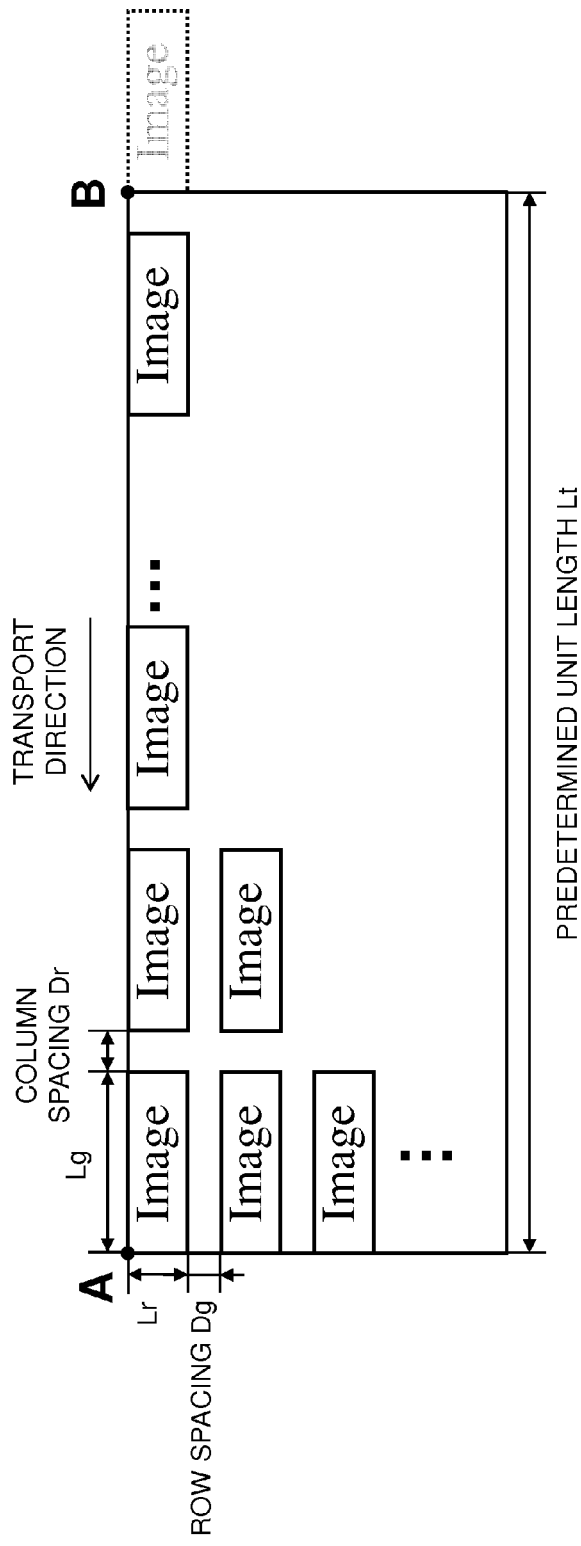
FIG. 20 is a diagram explaining the regular disposition adjustment technique in a case where the angle of inclination is 0°.

Subsequently, the flow proceeds to step S45 where the CPU of the PC 217 approximately adjusts the column spacing Dr so that the row-direction length Wg (or Lt) of the disposition adjustment region becomes a multiple (multiple of n1, multiple of n2) of the number of dispositions of the total length of the row-direction length Lg and the column spacing Dr of the background pattern print image (refer to FIGS. 20 and 21).

Subsequently, the flow proceeds to step S50 where the CPU of the PC 217 determines whether or not the absolute value of the angle of inclination set in the above described step S20 is 90° (+90°, −90°, or 270°). If the absolute value of the angle of inclination is 90°, the condition is satisfied and the flow proceeds to step S65 described later.

On the other hand, if the absolute value of the angle of inclination is not 90°, the condition is not satisfied and the flow proceeds to step S55.

In step S55, the CPU of the PC 217 calculates the number (n3: integer) of background pattern print images disposed in the column direction of a predetermined unit length in a case where the background pattern print image is disposed in the disposition adjustment region under current regular disposition settings.

Subsequently, the flow proceeds to step S60 where the CPU of the PC 217 approximately adjusts the row spacing Dg so that the column-direction length Hr of the disposition adjustment region becomes a multiple (multiple of n3) of the number of dispositions of the total length of the column-direction length Lr and the row spacing Dg of the background pattern print image (refer to FIG. 21).

Subsequently, the flow proceeds to step S65 where the CPU of the PC 217 expands and disposes the background pattern print image across the entire image expansion region in accordance with the regular disposition at this time, and layers and disposes the repeated print image as well in the image expansion region, thereby performing the repeated unit image generation processing that generates a repeated unit image corresponding to the repeated unit region. This flow then terminates here.

The repeated unit image thus generated is sent to the tape printer 1 and expanded in the image buffer 213a. With this arrangement, it is possible for the tape printer 1 to perform repeated printing on the print-receiving tape 150.

Advantages of this Embodiment

As described above, in this embodiment, after the regular disposition of the background pattern print image in the repeated unit region is set in step S20, the regular disposition is adjusted from step S30 to step S60 so as to impart periodicity with respect to the predetermined unit length Lt along the transport direction.

Specifically, in this adjustment of the regular disposition, the disposition adjustment region is set and at least one spacing adjustment of the column spacing adjustment of step S40 and step S45 and the row spacing adjustment of step S55 and step S60 is performed. The column spacing adjustment approximately adjusts the column spacing Dr set in step S20 so that the length Wg (or the predetermined unit length Lt) of the sides parallel with the angle of inclination of the disposition adjustment region becomes an integer multiple of the total length of the row-direction length Lg and the column spacing Dr of the background pattern print image. Further, the row spacing adjustment approximately adjusts the row spacing Dg set in step S20 so that the length Hr of the sides parallel with the column direction of the disposition adjustment region becomes an integer multiple of the total length of the column-direction length Lr and the row spacing Dg of the background pattern print image.

By adjusting the regular disposition settings in this manner, it is possible to maintain the continuity and improve the aesthetics of the print of the background pattern print image between the repeated unit regions, even in a case where the regular disposition of the background pattern print image in the repeated unit region is arbitrarily set in accordance with user intensions.

Further, in particular, in this embodiment, it is possible to perform column spacing adjustment only and omit row spacing adjustment in the adjustment of the regular disposition in a case where the angle of inclination is 0° or 180°. Further, it is possible to perform row spacing adjustment only and omit column spacing adjustment in the adjustment of the regular disposition in a case where the absolute value of the angle of inclination is 90°. Thus it is possible to only perform the necessary spacing adjustment and omit the unnecessary spacing adjustment, thereby improving processing efficiency.

Further, in particular, in this embodiment, the background pattern print image is printed, and the repeated print image is printed in a predetermined position of the respective repeated unit regions, on the print-receiving tape 150. In this case, the predetermined unit length Lt of the repeated unit region is set based on the length and spacing of the repeated print image along the transport direction, making it possible to print the repeated unit image at equal intervals and improve aesthetics.

Note that while the periodicity of the regular disposition with respect to a predetermined unit length is maintained by adjusting the row spacing and column spacing parameters in the above described embodiment, the present disclosure is not limited thereto. While not particularly shown, the periodicity of the regular disposition with respect to the predetermined unit length may be additionally maintained by adjusting the angle of inclination, adjusting the character spacing in a case where the background pattern print image is based on text, or adjusting the parameters, including the row spacing and column spacing, in a complex manner as well.

Further, other than that already stated above, techniques based on the above described embodiments and each of the modifications may be suitably utilized in combination as well.

What is claimed is:

1. A non-transitory computer-readable recording medium, storing a print data editing program executable on a computing device provided in an operation terminal for operating a recorded matter producing apparatus, the recorded matter producing apparatus comprising a feeder configured to feed a medium to be recorded on and a printing head configured to perform printing based on print data on said medium to be recorded fed by said feeder, the recorded matter producing apparatus being configured to produce a recorded matter, wherein desired printing is printed on said medium to be recorded on based on said print data along a transport direction by said feeder, the print data editing program, when executed, causing the recorded matter producing apparatus to perform:

a background pattern print data generating that generates identical background pattern print data respectively to be printed in a plurality of regularly disposed locations in a repeated unit region for repeatedly printing based on a predetermined unit length along said transport direction of said medium to be recorded;
   a disposition setting that sets a row spacing with a disposition direction along a reference direction of said background pattern print data as a row direction, a column spacing, and an angle of inclination of said row direction with respect to said transport direction, for said regular disposition of said background pattern print data in said repeated unit region; and
   a disposition adjusting that adjusts said regular disposition set in said disposition setting, the printing of said background pattern print data being continuous at the boundary between two continuous repeated unit regions,
   the disposition adjusting including:
      setting a rectangular disposition adjustment region that is enclosed by both two sides parallel with said angle of inclination and two sides orthogonal to said angle of inclination, and comprises a length of the diagonal equal to said predetermined unit length, being set, and
      at least one of: (a) column spacing adjustment that approximately adjusts said column spacing set in said disposition setting so that a length of the sides parallel with said angle of inclination in said rectangular disposition adjustment region becomes an integer multiple of a total length of a length of said background pattern print data along said row direction and said column spacing, and (b) row spacing adjustment that approximately adjusts said row spacing set in said disposition setting so that a length of the sides orthogonal to said angle of inclination in said rectangular disposition adjustment region becomes an integer multiple of a total length of a length of said background pattern print data along said reference direction and said row spacing.

2. The recording medium according to claim 1, wherein:
   in said disposition adjusting, only said column spacing adjustment is performed in a case where said angle of inclination set in said disposition setting is 0° or 180°, and only said row spacing adjustment is performed in a case where an absolute value of said angle of inclination set in said disposition setting is 90°.

3. The recording medium according to claim 1, wherein:
   in said disposition adjusting, both said column spacing adjustment and said row spacing adjustment are performed in a case where said angle of inclination set in said disposition setting is not 0° or 180° and an absolute value of said angle of inclination is not 90°.

4. The recording medium according to claim 1, wherein:
   said computing device is further caused to execute repeated print data generating that generates repeated print data to be printed in a predetermined position in each of said repeated unit regions, said predetermined unit length being set based on a length and a spacing of said repeated print data along said transport direction.

5. A printing method comprising:

a background pattern print data generating process that generates identical background pattern print data to be printed in a plurality of locations in each of a plurality of repeated unit regions of a printing medium, the plurality of repeated unit regions being disposed at non-overlapping positions along a transport direction of said printing medium, each of the plurality of repeated unit regions being of a predetermined unit length, wherein the plurality of repeated unit regions are separated by print boundaries in the transport direction, the print boundaries restricting print data designated for a first repeated unit region from being printed in an immediately following second repeated unit region;

a disposition setting process that sets a regular disposition of the background pattern print data in each of the repeated unit regions, the regular disposition including a row spacing with a disposition direction along a reference direction of said background pattern print data as a row direction, a column spacing, and an angle of inclination of said row direction with respect to said transport direction, the row spacing defining a spacing, in a direction perpendicular to the reference direction, between a first instance of the background pattern print data in the first repeated unit region and a second instance of the background pattern print data in the first repeated unit region, and the column spacing defining a spacing, in the reference direction, between the first instance of the background pattern print data and a third instance of the background pattern print data in the first repeated unit region; and a disposition adjusting process that adjusts said regular disposition set in said disposition setting process so as to impart periodicity to the background pattern print data in each of the plurality of repeated unit regions with respect to said predetermined unit length along said transport direction the disposition adjusting including:

setting a rectangular disposition adjustment region that is enclosed by two sides spaced apart from one another and parallel with said angle of inclination and two sides spaced apart and orthogonal to said angle of inclination, the rectangular disposition adjustment region comprising a diagonal having a length equal to said predetermined unit length, the diagonal connecting two opposing vertices of the rectangular disposition adjustment region, and at least one of: (a) column spacing adjustment that approximately adjusts said column spacing set in said disposition setting so that a length of the sides parallel with said angle of inclination in said disposition adjustment region becomes an integer multiple of a total length of a length of said background pattern print data along said row direction and said column spacing, and (b) row spacing adjustment that approximately adjusts said row spacing set in said disposition setting so that a length of the sides orthogonal to said angle of inclination in said disposition adjustment region becomes an integer multiple of a total length of a length of said background pattern print data along said reference direction and said row spacing.

6. The method according to claim 5, wherein:

in said disposition adjusting, only said column spacing adjustment is performed in a case where said angle of inclination set in said disposition setting is 0° or 180°, and only said row spacing adjustment is performed in a case where an absolute value of said angle of inclination set in said disposition setting is 90°.

7. The method according to claim 5, wherein:

in said disposition adjusting, both said column spacing adjustment and said row spacing adjustment are performed in a case where said angle of inclination set in said disposition setting is not 0° or 180° and an absolute value of said angle of inclination is not 90°.

8. The method according to claim 5, further comprising:

a repeated print data generating process that generates repeated print data to be printed in a predetermined position in each of said repeated unit regions, wherein said predetermined unit length is set based on a length and a spacing of said repeated print data along said transport direction.

9. A non-transitory computer-readable recording medium, storing a print data editing program executable on a computing device provided in an operation terminal for operating a recorded matter producing apparatus, the recorded matter producing apparatus comprising a feeder configured to feed a medium to be recorded on and a printing head configured to perform printing based on print data on said medium to be recorded fed by said feeder, the recorded matter producing apparatus being configured to produce a recorded matter, wherein desired printing is printed on said medium to be recorded on based on said print data along a transport direction by said feeder, the print data editing program, when executed, causing the recorded matter producing apparatus to perform:

a background pattern print data generating that generates identical background pattern print data to be printed in a plurality of locations in each of a plurality of repeated unit regions, the plurality of repeated unit regions being disposed at non-overlapping positions along said transport direction of said medium to be recorded, each of the plurality of repeated unit regions being of a predetermined unit length, wherein the plurality of repeated unit regions are separated by print boundaries in the transport direction, the print boundaries restricting print data designated for a first repeated unit region from being printed in an immediately following second repeated unit region;

a disposition setting that sets a regular disposition of the background pattern print data in each of the repeated unit regions, the regular disposition including a row spacing with a disposition direction along a reference direction of said background pattern print data as a row direction, a column spacing, and an angle of inclination of said row direction with respect to said transport direction, the row spacing defining a spacing between a first instance of the background pattern print data in the first repeated unit region and a second instance of the background pattern print data in the first repeated unit region in a direction perpendicular to the reference direction, and the column spacing defining a spacing between the first instance of the background pattern print data and a third instance of the background pattern print data in the first repeated unit region in the reference direction; and a disposition adjusting that adjusts said regular disposition set in said disposition setting so as to impart periodicity to the background pattern print data in each of the plurality of repeated unit regions with respect to said predetermined unit length along said transport direction the disposition adjusting including:

setting a rectangular disposition adjustment region that is enclosed by two sides spaced apart from one another and parallel with said angle of inclination and two sides spaced apart and orthogonal to said angle of inclination, the rectangular disposition adjustment region comprising a diagonal having a length equal to said predetermined unit length, the diagonal connecting two opposing vertices of the rectangular disposition adjustment region, and at least one of: (a) column spacing adjustment that approximately adjusts said column spacing set in said disposition setting so that a length of the sides parallel with said angle of inclination in said rectangular disposition adjustment region becomes an integer multiple of a total length of a length of said background pattern print data along said row direction and said column spacing, and (b) row spacing adjustment that approximately adjusts said row spacing set in said disposition setting so that a length of the sides orthogonal to said angle of inclination in said rectangular disposition adjustment region becomes an integer multiple of a total length of a length of said background pattern print data along said reference direction and said row spacing.

10. The recording medium according to claim 9, wherein:

said computing device is further caused to execute repeated print data generating that generates repeated print data to be printed in a predetermined position in each of said repeated unit regions, and said predetermined unit length being set based on a length and a spacing of said repeated print data along said transport direction.

\* \* \* \* \*